US012632146B2

(12) United States Patent
Byun et al.

(10) Patent No.: US 12,632,146 B2
(45) Date of Patent: May 19, 2026

(54) TOUCH SCREEN DRIVING

(71) Applicant: SAMSUNG ELECTRONICS CO., LTD., Suwon-si (KR)

(72) Inventors: San-Ho Byun, Suwon-si (KR); Junchul Park, Suwon-si (KR); Taegyun Song, Suwon-si (KR)

(73) Assignee: Samsung Electronics Co. Ltd., Suwon-si (KR)

( * ) Notice: Subject to any disclaimer, the term of this patent is extended or adjusted under 35 U.S.C. 154(b) by 4 days.

(21) Appl. No.: 18/742,854

(22) Filed: Jun. 13, 2024

(65) Prior Publication Data

US 2025/0130671 A1    Apr. 24, 2025

(30) Foreign Application Priority Data

Oct. 24, 2023    (KR) ........................ 10-2023-0142811

(51) Int. Cl.
| | |
|---|---|
| *G06F 3/041* | (2006.01) |
| *G06F 3/044* | (2006.01) |
| *G09G 3/20* | (2006.01) |

(52) U.S. Cl.
CPC ........ *G06F 3/04184* (2019.05); *G06F 3/0412* (2013.01); *G06F 3/0446* (2019.05); *G09G 3/20* (2013.01); *G09G 2354/00* (2013.01)

(58) Field of Classification Search
None
See application file for complete search history.

(56) References Cited

U.S. PATENT DOCUMENTS

| | | | | |
|---|---|---|---|---|
| 6,049,355 A | * | 4/2000 | Kameyama | .............. H04N 5/18 |
| | | | | 348/E9.037 |
| 10,120,509 B2 | | 11/2018 | Chandran et al. | |
| 10,503,320 B2 | | 12/2019 | Liu et al. | |
| 10,613,690 B2 | | 4/2020 | Takahashi | |
| 10,705,654 B2 | | 7/2020 | Kim et al. | |
| 11,467,694 B2 | | 10/2022 | Ito et al. | |
| 11,599,223 B1 | | 3/2023 | Gowreesunker et al. | |
| 11,640,211 B2 | | 5/2023 | Kim et al. | |
| 11,656,729 B2 | | 5/2023 | Park et al. | |
| 2023/0206828 A1 | * | 6/2023 | Chae | ..................... G09G 3/035 |
| | | | | 345/55 |

FOREIGN PATENT DOCUMENTS

CN            114320029 B   * 10/2022

* cited by examiner

*Primary Examiner* — Duane N Taylor, Jr.
(74) *Attorney, Agent, or Firm* — Fish & Richardson P.C.

(57) ABSTRACT

A touch sensor controller according to some implementations includes a reference signal generator generating a reference signal based on an input image signal and a receiver connected to a touch electrode, receiving a sensing signal from the touch electrode, and generating an output signal based on difference between the reference signal and the sensing signal.

20 Claims, 19 Drawing Sheets

TOUCH SCREEN DRIVING

CROSS-REFERENCE TO RELATED APPLICATION

This application claims priority to and the benefit of Korean Patent Application No. 10-2023-0142811, filed in the Korean Intellectual Property Office on Oct. 24, 2023, the entire contents of which are incorporated herein by reference.

BACKGROUND

Aspects of the present disclosure relate to touch sensor controllers, touch screen driving circuits, and touch screen driving methods.

A touch screen may include a display panel for image display and a touch sensor for touch sensing. The display panel and the touch sensor may be formed integrally with vertically stacked or share at least one layer.

The distance between a display panel and a touch sensor is much closer according to the trend of ultra-thin touch screens. Accordingly, parasitic capacitances between the display panel and electrodes of touch sensor may be increased, and a display noise generated during display operation may flow into the touch sensor through a parasitic capacitor.

SUMMARY

Aspects of the present disclosure provide touch sensor controllers, touch screen driving circuits, and touch screen driving methods that can reduce or remove a noise signal from a sensing signal. Because the display noise may deteriorate touch sensing sensitivity, these controllers, driving circuits, and driving methods can provide improved touch sensing sensitivity.

Some aspects of this disclosure relate to a touch sensor controller which includes a reference signal generator generating a reference signal based on an input image signal; and a receiver connected to a touch electrode, the receiver configured to receive a sensing signal from the touch electrode and generate an output signal based on a difference between the reference signal and the sensing signal.

In some implementations, a touch screen driving circuit includes a display driving circuit generating a plurality of source signals based on an input image signal and providing the plurality of source signals to a plurality of source lines; and a touch sensor controller receiving a plurality of sensing signals from a plurality of touch electrodes, generating a reference signal having substantially the same waveform as the waveform of the noise signal transmitted to the plurality of touch electrodes by the plurality of source signals based on the input image signal, and generating a plurality of touch signals based on the plurality of sensing signals and the reference signal.

In some implementations, a touch screen driving method includes receiving an input image signal, generating a conversion signal by processing the input image signal, selecting a gamma voltage based on the conversion signal and generating a reference signal by amplifying the selected gamma voltage, and removing a noise signal from a sensing signal based on the reference signal.

BRIEF DESCRIPTION OF THE DRAWINGS

FIG. 5 is a diagram illustrating the operation of a touch screen device according to some implementations.

FIG. 8 is a block diagram of a touch screen driving circuit according to some implementations.

DETAILED DESCRIPTION

Figure 1:
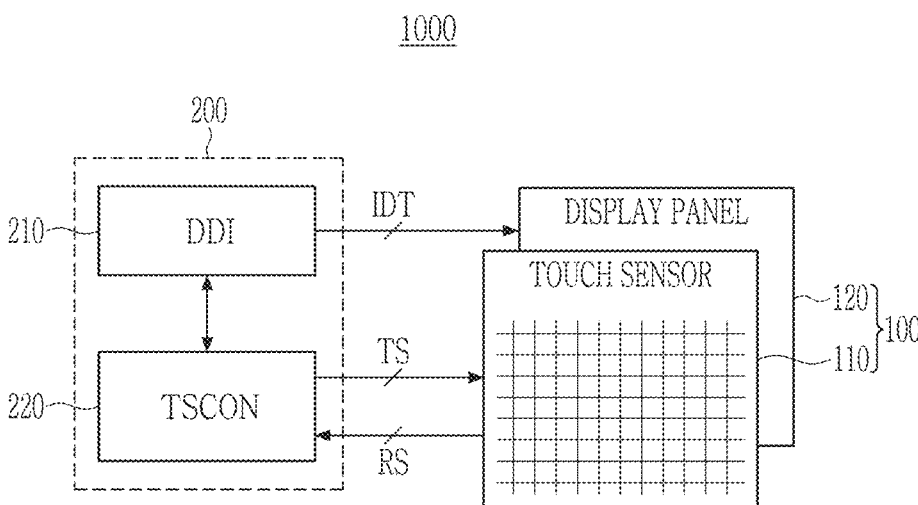
FIG. 1 is a block diagram of a touch screen device according to some implementations.

In the following detailed description, certain examples according to the present disclosure have been shown and described by way of illustration. Hereinafter, with reference to the accompanying drawings, various implementations of the present disclosure will be described in detail so that a person of an ordinary skill in the art could easily carry out the present disclosure. As those skilled in the art would realize, the described implementations may be modified in various different ways, all without departing from the spirit or scope of the present disclosure. This disclosure may be embodied in many different forms and is not limited to the specific examples set forth herein.

Accordingly, the drawings and description are to be regarded as illustrative in nature and not restrictive. Like reference numerals designate like elements throughout the specification. In order to clearly describe the present disclosure, parts irrelevant to the description are omitted, and the same reference numerals are assigned to the same or similar element throughout the specification. In flowcharts described with reference to drawings, an operation order may be changed, operations may be merged, a certain operation may be divided, and a specific operation may not be performed.

In addition, a singular form of expressions may be interpreted as singular or plural unless explicit expressions such as "one" or "single" are used. A term including ordinal numbers, such as first and second, etc., may be used to describe various elements, but such elements are not limited by these terms. These terms may be used for the purpose of distinguishing one element from another element.

FIG. 1 is a block diagram of a touch screen device according to some implementations.

Referring to FIG. 1, a touch screen device 1000 according to some implementations may be applicable to various electronic devices. For example, the touch screen device 1000 may be included in an electronic device such as a personal computer (PC), a tablet PC, e-reader (or e-book reader), a personal digital assistant (PDA), a portable multimedia player (PMP), a digital camera, a portable game console, a monitor, a television, a mobile terminal, a smartphone, a wearable device, an internet of things (IoT) device, an electronic blackboard, a refrigerator, or a navigation device. In addition, the touch screen device 1000 may be included in an electronic device provided as a part of vehicles, furniture, manufacturing facilities, door, various measuring devices, and the like.

The touch screen device 1000 may include a touch screen 100 and a touch screen driving circuit 200 driving the touch screen 100. The touch screen 100 may include a touch sensor 110 and a display panel 120 and may provide touch sensing and display functions. A touch screen driving circuit 200 may include a display driving circuit DDI 210 and a touch sensor controller TSCON 220. The display driving circuit DDI 210 and the touch sensor controller 220 may be integrated into a single semiconductor chip or may be separately implemented in a plurality of semiconductor chips. In some implementations, the display driving circuit DDI 210 and the touch sensor controller 220 may be implemented as a single semiconductor module.

The touch screen 100 may display an image and receive a touch input from a user. The touch screen 100 may operate as an input device or output device of an electronic device and may operate as a proximity sensor sensing the approach of a conductive object. In some implementations, the touch screen 100 may further include a fingerprint sensor, and the touch screen device 1000 may perform a fingerprint recognition function. The touch sensor 110 may sense a touch (or a touch input) on the touch screen 100 and output sensing signals. At this time, the touch (or touch input) may include not only direct contact of the conductive object on the touch screen 100, but also approaching of the conductive object to the touch screen 100. For example, a conductive object may include a user's body (e.g., skin such as finger, palm, face, ears, etc.), a touch pen, a stylus pen, etc. The touch sensor 110 may be stacked on the display panel 120 and may be attached to a front surface (e.g., the surface emitting light signals) of the display panel 120. In some implementations, the touch sensor 110 may cover the front surface of the display panel 120.

The touch sensor 110 may be implemented as a transparent panel having a touch-sensitive surface. In some implementations, the touch sensor 110 may be implemented as a touch sensor array of patterned transparent electrodes.

The touch sensor 110 may include a plurality of electrodes. The sensing signals may be output by the plurality of electrodes using one of various touch sensing methods. As an example, the plurality of electrodes may output the sensing signals with a capacitance sensing method.

The touch sensor 110 may include a driving electrode to which a driving signal TS is applied and a receiving electrode to which a sensing signal RS is output. The driving electrode and the receiving electrode may be arranged to extend in different directions. For example, the driving electrode may extend in a first direction, and the receiving electrode may extend in a second direction which is perpendicular to the first direction. The driving electrode and the receiving electrode may be referred to as a driving channel and a receiving channel, respectively. The touch sensor 110 may include a plurality of driving electrodes arranged in parallel with each other, and a plurality of receiving electrodes arranged in parallel with each other.

The driving electrode and the receiving electrode may cross each other, and mutual capacitance may be formed between the driving electrode and the receiving electrode crossing each other. Each point where mutual capacitance is formed may be referred to as a sensing node of the touch sensor 110.

As another example, the touch sensor 110 may include a plurality of sensing electrodes arranged in a matrix form, and a capacitance may be formed on each of the plurality of sensing electrodes. For example, a capacitance may be formed between each of the plurality of sensing electrodes and a ground (or a conductive layer in touch screen 100), which may be referred to as self-capacitance. A driving signal TS may be applied to each of the plurality of sensing electrodes, and a sensing signal RS may be output from each of the plurality of sensing electrodes. In other words, each of the plurality of sensing electrodes may operate as a driving electrode and a receiving electrode, and each of the plurality of sensing electrodes may be referred to as a sensing node of the touch sensor 110.

A driving signal TS is applied through the driving electrode, a sensing signal RS representing a capacitance (e.g., a mutual capacitance or self-capacitance) is generated based on the driving signal TS, and the sensing signal RS may be output through the receiving electrode. If a conductive object such as human skin (e.g., a finger) or a stylus contacts or approaches the sensing node of the touch sensor 110, the capacitance corresponding to the sensing node may change, and the sensing signal RS output from the touch sensor 110 may change according to the changed capacitance. For example, the level of the sensing signal RS may increase or decrease compared to before the touch occurs. A touch data may be generated based on the level of the sensing signal RS output from the touch sensor 110.

The display panel 120 may include a plurality of gate lines, a plurality of source lines, and a plurality of pixels arranged in a matrix form at the intersection of the plurality of gate lines and the plurality of source lines. A plurality of pixels may display an image based on image data IDT received through a plurality of source lines and a plurality of gate lines. The image may be updated according to a predetermined frame rate.

The display panel 120 may be implemented as one of a liquid crystal display (LCD), a light emitting diode (LED) display, an Organic LED (OLED) display, an Active-Matrix OLED (AMOLED) display, an Electrochromic Display (ECD), a Digital Mirror Device (DMD), an Actuated Mirror Device (AMD), a Grating Light Valve (GLV), a plasma display panel (PDP), an Electro Luminescent Display (ELD), a Vacuum Fluorescent Display (VFD), or may be implemented as flat panels of other types or flexible panels.

In FIG. 1, the touch sensor 110 and the display panel 120 are shown as separate units, but implementations are not limited thereto. For example, the touch screen 100 may be implemented as an in-cell type panel in which electrodes of the touch sensor 110 and pixels of display panel 120 are combined or an on-cell type panel in which electrodes of the touch sensor 110 are placed at the upper surface of the display panel 120.

The touch sensor controller 220 may scan (e.g., drive and sense) the touch sensor 110. In other words, touch sensor controller 220 may perform touch sensing. The touch sensor controller 220 may provide a driving signal TS to driving electrodes of the touch sensor 110 and receive a sensing signal RS generated based on the driving signal TS from the touch sensor 110.

The display driving circuit 210 may generate image data IDT and transmit the image data IDT to the display panel 120. The plurality of pixels of the display panel 120 may display an image based on the image data IDT. The display driving circuit 210 may receive an input image signal from a host controlling the touch screen device 1000 and generate image data IDT based on the input image signal. The touch screen driving circuit 200 may operate based on the instruction of the host and may exchange data with the host.

In some implementations, the host may include an application processor, and the application processor AP may be implemented as a system on chip (SoC). The system on chip (SoC) may include a system bus (not shown) to which a protocol having a predetermined standard bus specification is applied and may include various intelligent properties (IP) connected to the system bus. As a standard for system bus, various types of standards such as Advanced Microcontroller Bus Architecture (AMBA) protocol of ARM (Advanced RISC Machine) may be applied.

The sensing signal RS output from the touch sensor 110 may be affected by the image data IDT which the display driving circuit 210 transmits to the display panel 120. For example, as the thickness of the touch screen 100 becomes thinner, the touch sensor 110 and the display panel 120 become closer and display noise such as cross-talk may occur in the touch sensor 110 when the display panel 120 displays an image. This may result in the sensing signal RS including display noise.

The touch sensor controller 220 may generate a touch signal obtained by removing a noise signal (e.g., display noise) from the sensing signal RS. For example, the touch sensor controller 220 may generate a reference signal based on the image data IDT. The touch sensor controller 220 may remove crosstalk noise signal of the sensing signal RS by using the reference signal.

The touch sensor controller 220 may convert the touch signal, which is an analog signal, into digital touch values, and generate touch data including touch values corresponding to respective sensing nodes of the touch sensor 110. The touch sensor controller 220 may determine that a touch input is received in at least one specific position on the touch screen 100 based on touch data and calculate a position (e.g., touch coordinates) where the touch input is received. The touch sensor controller 220 may transmit the touch coordinates to the host. In some implementations, the host may be included in the touch screen device 1000. In some implementations, the touch sensor controller 220 may calculate the touch input and provide the touch input to the host with the touch coordinates.

In some implementations, the touch sensor controller 220 may receive voltage changes that cause display noise to the touch sensor 110 from the display driving circuit 210 at a plurality of points on the display panel 120, or offset values calculated based on the voltage changes, as compensation information, and may remove display noise from the touch data or discard the touch data based on the compensation information.

As such, the touch sensor controller 220 may remove the noise from the sensing signal RS or process the touch data based on the noise data, such that reliability of touch data may be improved, and touch sensing sensitivity may be improved.

Figure 2:
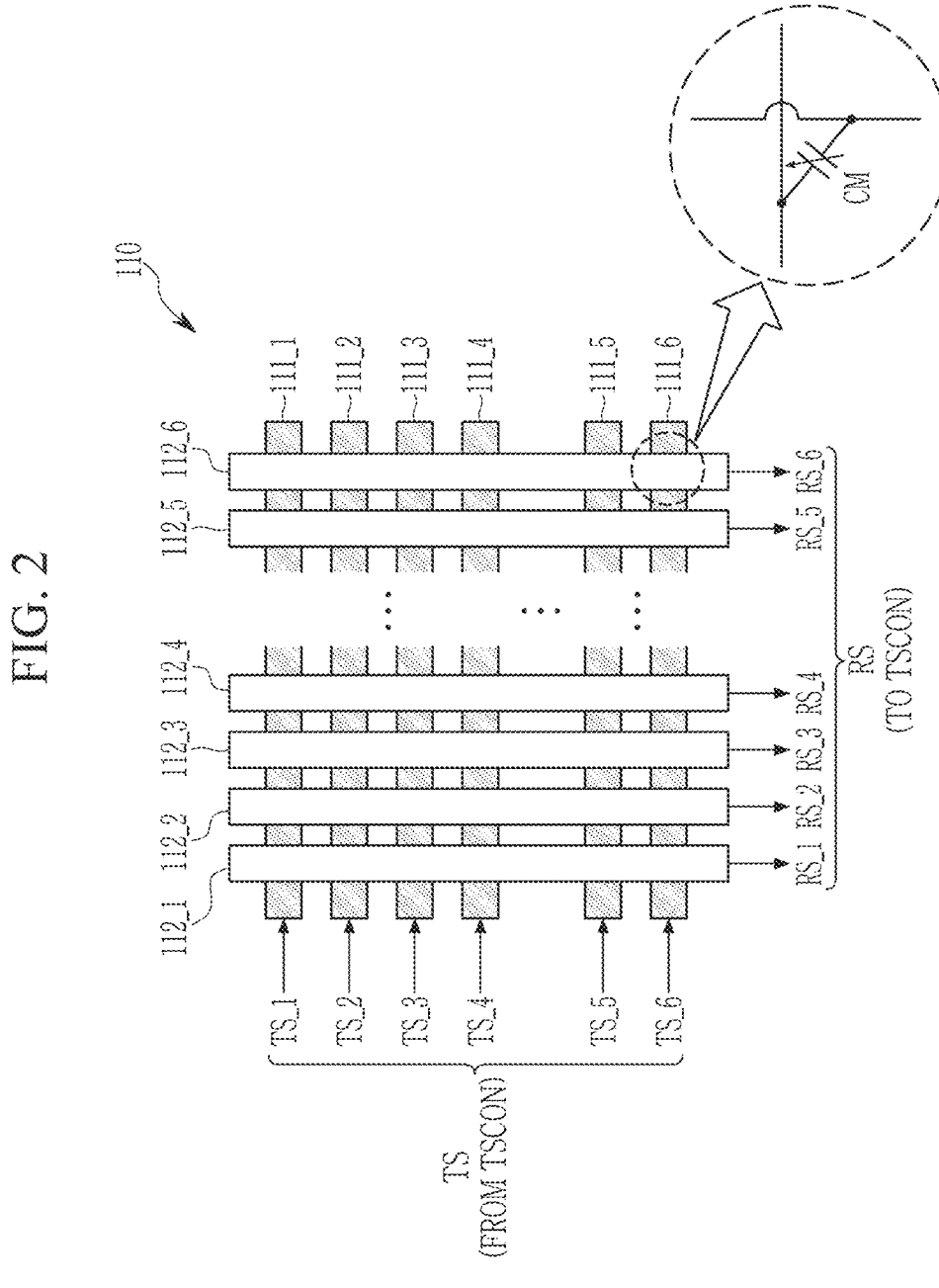
FIG. 2, 3, and FIG. 4 are diagrams illustrating a touch sensor according to some implementations.
Figure 3:
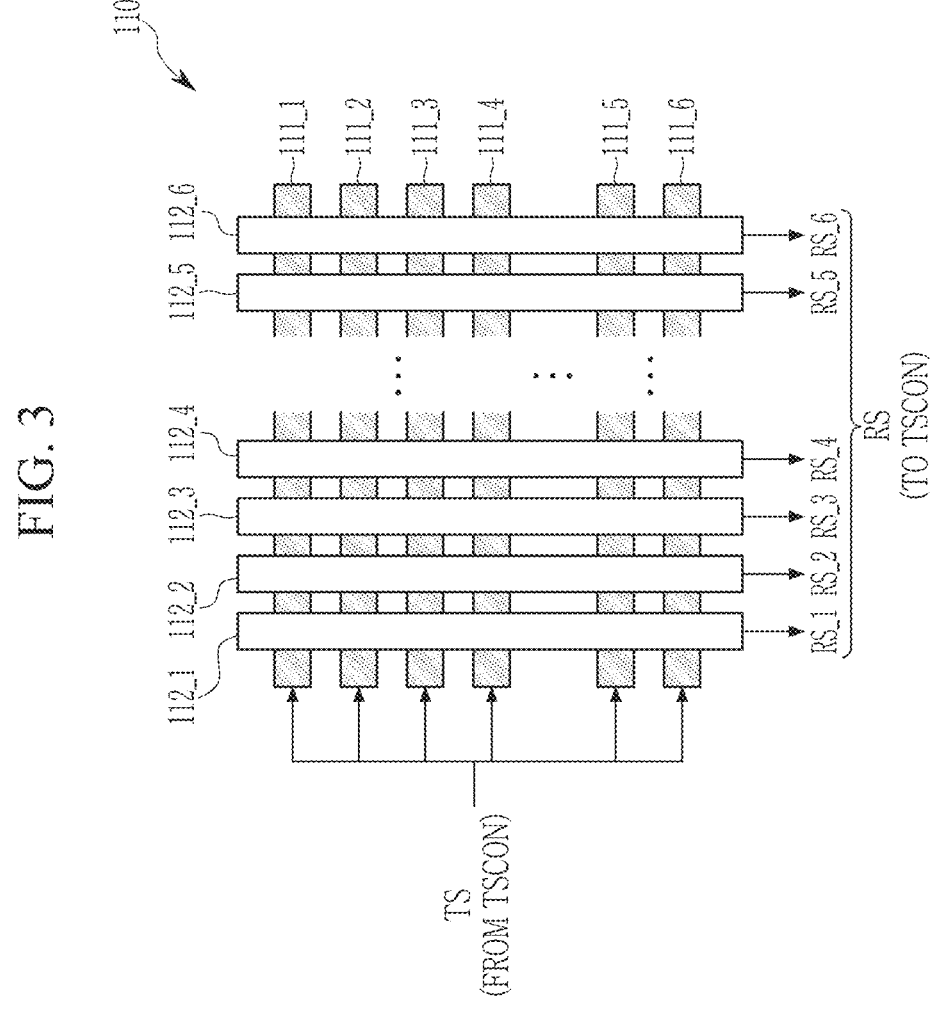
Figure 4:
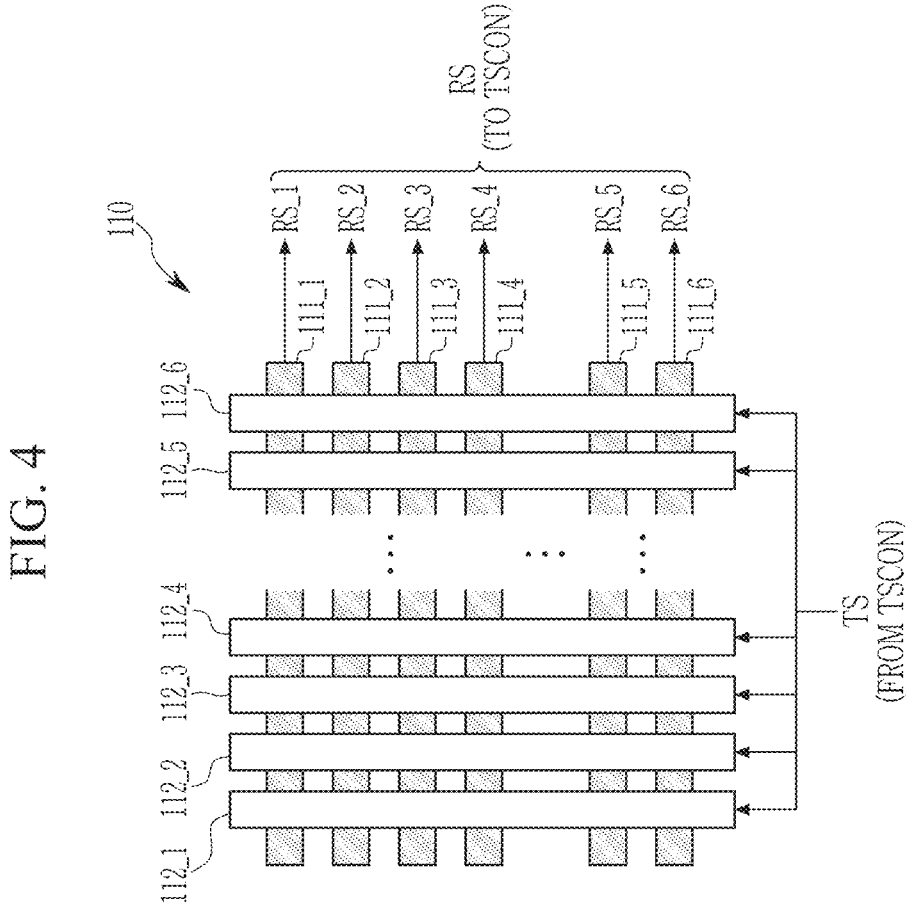

FIG. 2, 3, and FIG. 4 illustrate examples of operating a touch sensor (e.g., touch sensor 110) according to some implementations.

Referring to FIG. 2, the touch sensor 110 according to some implementations may include a plurality of driving electrodes 111_1 to 111_6 and a plurality of receiving electrodes 112_1 to 112_6. The plurality of driving electrodes 111_1 to 111_6 may include m driving electrodes, the plurality of receiving electrodes 112_1 to 112_6 may include n driving electrodes, and m and n may be integers greater than 1. The m and n may vary according to the resolution of the touch sensor 110 and are not limited to this example.

The plurality of driving electrodes 111_1 to 111_6 may extend in a first direction, and the plurality of receiving electrodes 112_1 to 1126 may extend in a second direction perpendicular to the first direction. A mutual capacitance CM may be formed between the plurality of driving electrodes 111_1 to 111_6 and the plurality of receiving electrodes 112_1 to 112_6.

The plurality of driving electrodes 111_1 to 111_6 may receive the driving signal TS. For example, the touch sensor controller TSCON (e.g., the touch sensor controller 220 of FIG. 1) may include a plurality of transmitters corresponding to the plurality of driving electrodes 111_1-111_6, and the plurality of transmitter may provide the driving signal TS to the plurality of driving electrodes 111_1-111_6. The driving signal TS may include a plurality of signals TS_1 to TS_6. The plurality of signals TS_1 to TS_6 may be sequentially or simultaneously applied to a plurality of driving electrodes 111_1 to 111_6.

In some implementations, the plurality of driving electrodes 111_1 to 1116 may be operated in a multiple-driving method. The signals TS_1 to TS_6 modulated based on different codes may be simultaneously applied to the plurality of driving electrodes 111_1 to 111_6. For example, driving signals with opposite polarities may be simultaneously applied to the first and second driving electrodes 111_1 and 111_2, and driving signals with opposite polarities may be simultaneously applied to the third and fourth driving electrodes 111_3 and 111_4.

The plurality of receiving electrodes 112_1 to 112_6 may output a sensing signal RS. The sensing signal RS may include a plurality of signals RS_1 to RS_6. For example, the touch sensor controller TSCON may include a plurality of receivers corresponding to the plurality of receiving electrodes 112_1 to 1126, and the plurality of receivers may receive a sensing signal RS from the plurality of receiving electrodes 112_1 to 112_6.

The sensing signal RS may include a signal corresponding to a mutual capacitance CM between the plurality of driving electrodes 111_1 to 111_6 and the plurality of receiving electrodes 112_1 to 112_6. For example, if a touch occurs in a sensing node on the touch sensor 110, the mutual capacitance CM of the sensing node may be decreased, and the level of the sensing signal RS may be decreased or increased compared to before the touch occurs.

The sensing signal RS may include a noise signal. For example, when touch sensing is performed during a display period in which an image is displayed on the display panel 120 of FIG. 1, the sensing signal RS may include display noise caused by the display. The touch sensor controller TSCON may remove the noise signal from the sensing signal RS using the reference signal.

A plurality of receivers may receive a plurality of signals RS_1 to RS_6 and a reference signal. The plurality of receivers may remove noise signal from the plurality of signals RS_1 to RS_6 by using the reference signal and may output the plurality of touch signals. The touch sensor controller TSCON may determine two-dimensional touch coordinates in a first direction and a second direction based on a plurality of touch signals.

Referring to FIG. 3, a plurality of driving electrodes 111_1 to 111_6 may receive a driving signal TS from a touch sensor controller TSCON. In this case, multiple driving electrodes 111_1 to 111_6 simultaneously receive the driving signal TS, and the pulse waveform of the driving signal TS may be all the same.

A plurality of receiving electrodes 112_1 to 112_6 may generate a sensing signal RS based on the driving signal TS and output the sensing signal RS to a plurality of receivers. The sensing signal RS may include a plurality of signals RS_1 to RS_6. The plurality of receivers may remove the noise signal from the plurality of sensing signals by using the reference signal, and then generate the plurality of touch signals. One-dimensional touch coordinates may be determined in one direction (e.g., the second direction) based on the plurality of touch signals in the touch sensor controller TSCON.

In FIG. 4, the plurality of receiving electrodes 112 to 1-112_6 may operate as a driving electrode, and the plurality of driving electrodes 111_1-111_6 may operate as a receiving electrode. That is, a plurality of receiving electrodes 112_1 to 1126 may receive the driving signal TS from the touch sensor controller TSCON. In this case, a plurality of receiving electrodes 112_1 to 112_6 simultaneously receive the driving signal TS, and the pulse waveforms of the driving signals TS may all be the same.

The plurality of driving electrodes 111_1 to 111_6 may generate a sensing signal RS based on the driving signal TS and output the sensing signal RS to a plurality of receivers. The sensing signal RS may include a plurality of signals RS_1 to RS_6. The plurality of receivers may remove the noise signal from the sensing signal RS using the reference signal and generate the plurality of touch signals. One-dimensional touch coordinate may be determined in one direction (e.g., a first direction) based on the plurality of touch signals in the touch sensor controller TSCON.

Figure 5:
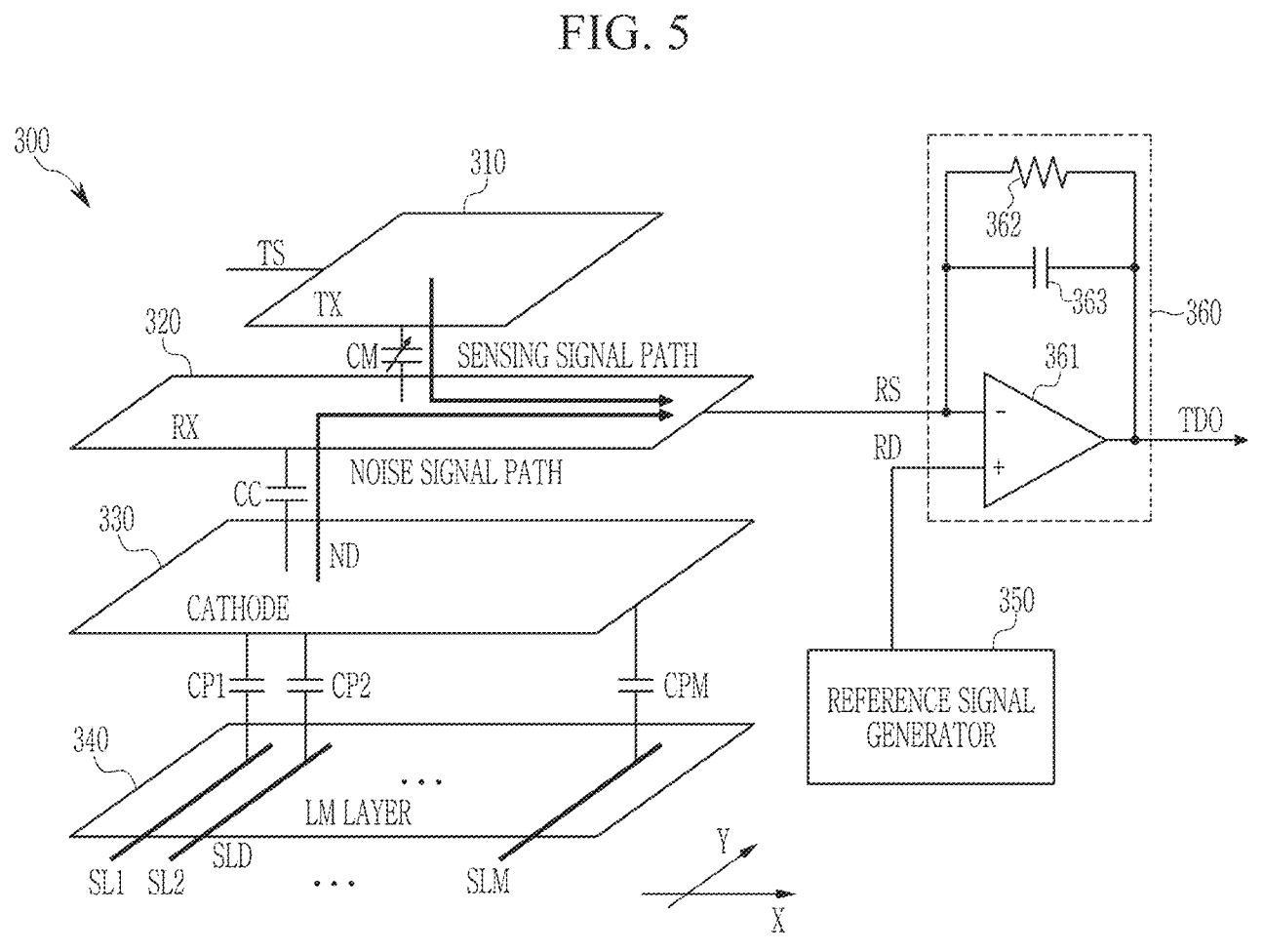
Figure 6:
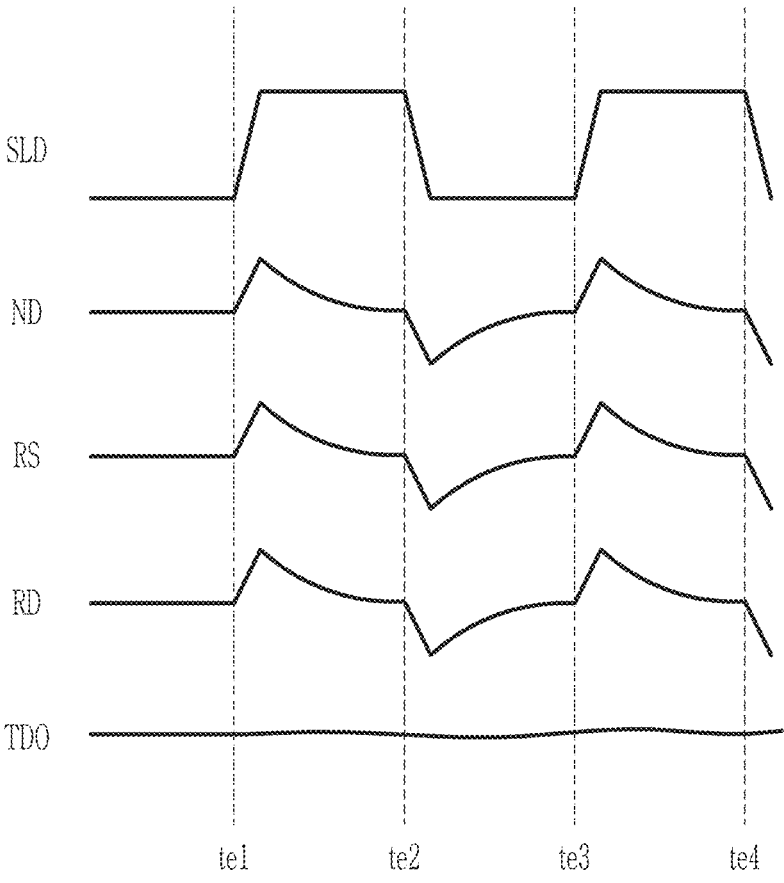
FIG. 6 is a diagram illustrating element signals of a touch screen device according to some implementations.

FIG. 5 illustrates an operation of a touch screen device according to some implementations, and FIG. 6 illustrates the signals of elements of a touch screen device according to some implementations.

Referring to FIG. 5, a touch screen device 300 according to some implementations may include a driving electrode TX 310, a receiving electrode RX 320, a cathode layer 330, a light emitting layer LM 340, a reference signal generator 350, and a receiver 360. The driving electrode 310 and the receiving electrode 320 may form a touch sensor (e.g., touch sensor 110 of FIG. 1). The driving electrode 310 and the receiving electrode 320 may have characteristics as described for the plurality of driving electrodes 111_1 to 111_6 and the plurality of receiving electrodes 112_1 to 112_6 in FIG. 2. In FIG. 5, one driving electrode 310 and one receiving electrode 320 are shown for convenience of explanation, but the touch screen device 300 includes a plurality of driving electrodes and a plurality of receiving electrodes.

A touch signal generated by the driving signal TS provided from the transmitter may be provided to the receiver 360 as a sensing signal RS through the sensing signal path. The sensing signal path may include a mutual capacitance CM between the driving electrode 310 and the receiving electrode 320. The driving signal TS may be provided to the receiver 360 as a sensing signal RS through the mutual capacitance CM. In FIG. 5, only a parasitic capacitance CC between the receiving electrode 320 and the cathode layer 330 is shown, but implementations are not limited thereto. Because the parasitic capacitance is formed between the driving electrode 310 and the cathode layer 330, it may be understood that the parasitic capacitance is formed between the touch sensor and the cathode layer 330.

In addition, a parasitic capacitance CC may be formed between the receiving electrode 320 and the cathode layer 330. A noise signal generated as the voltage of the cathode layer 330 varies may flow into the sensing signal RS through the noise signal path formed by the parasitic capacitance CC.

As the touch screen (e.g., the touch screen 100 in FIG. 1) of the touch screen device 300 tends to become ultra-thin, parasitic capacitance CC increases as the gap between the touch sensor and the cathode layer 330 decreases. As the parasitic capacitance CC increases, a noise signal flowing into the sensing signal RS increases, making it difficult to distinguish between the touch signal and the noise signal, and it becomes difficult to distinguish whether the change in the sensing signal RS is due to a touch input or noise signal.

The cathode layer 330 and the light emitting layer 340 may form a display panel (e.g., display panel 120 of FIG. 1). The light emitting layer 340 may be formed on the substrate of the display panel, and the cathode layer 330 may be formed on the upper surface of the light emitting layer 340.

The light emitting layer 340 may include a plurality of source lines SL1 to SLM (M is a positive integer). The plurality of source lines SL1 to SLM may be arranged in a first direction, for example, an X-axis direction, and may extend in a second direction, for example, a Y-axis direction. The light emitting layer 340 may include a plurality of gate lines, and the plurality of gate lines may be arranged in the second direction and extend in the first direction. The light emitting layer 340 may provide a plurality of pixels which may be formed at a point where the plurality of source lines SL1 to SLM and the plurality of gate lines intersect.

Parasitic capacitances CP1 to CPM may be formed between the plurality of source lines SL1 to SLM and the cathode layer 330. When a plurality of source signals is applied to the plurality of source lines SL1 to SLM, a voltage of the cathode layer 330 may be changed due to the parasitic capacitances CP1 to CPM. A constant voltage (e.g., ground voltage) may be applied to the cathode layer 330, but due to the RC delay caused by the parasitic resistor and parasitic capacitances CP1 to CPM of the cathode layer 330, the voltage of the cathode layer 330 may be changed when a plurality of source signals are applied to a plurality of source lines SL1 to SLM.

In FIG. 5 and FIG. 6, taking a second source line SL2 among the plurality of source lines SL1 to SLM as an example, when a source signal SLD is applied to the second source line SL2, a voltage ND of the cathode layer 330 may be changed. For example, the voltage ND may be varied at viewpoints te1 to te4 of the source signal SLD. In a source signal SLD, a rising edge may occur at viewpoints te1 and te3, and falling edges may occur at viewpoints te2 and te4. The voltage ND may include a rising noise at viewpoints te1 and te3, and may include a falling noise at viewpoints te2 and te4. The voltage ND including such a noise signal may affect the sensing signal RS through the noise signal path of the receiving electrode 320 and the cathode layer 330.

Accordingly, the noise signal may affect the sensing signal RS through the parasitic capacitance CC. The reference signal generator 350 may generate a reference signal RD for removing a noise signal from the sensing signal RS. The reference signal RD may be substantially equivalent to the noise signal of the sensing signal RS. For example, the reference signal generator 350 may generate the reference signal RD based on a plurality of source signals (including source signals SLD) applied to a plurality of source lines SL1 to SLM. A configuration in which the reference signal generator 350 generates the reference signal RD will be described later with reference to FIGS. 7 to 10. The reference signal generator 350 may transmit the reference signal RD to the receiver 360.

The receiver 360 may receive the sensing signal RS and the reference signal RD. The receiver 360 may remove the noise signal from the sensing signal RS based on the reference signal RD. The receiver 360 may generate an output signal TDO from which a noise signal is removed from the sensing signal RS.

The receiver 360 may include an amplifier 361, a resistor 362, and a capacitor 363. The amplifier 361 may receive a sensing signal RS from the receiving electrode 320 at a first input terminal and a reference signal RD from the reference signal generator 350 at a second input terminal. For example, the first input terminal may be an inverted input terminal (−) and the second input terminal may be a non-inverted input terminal (+). The amplifier 361 may generate the output signal TDO based on a difference between the sensing signal RS and the reference signal RD. The resistor 362 and the capacitor 363 may form a negative feedback loop between the output terminal and the first input terminal of the amplifier 361. In some implementations, the receiver 360 may be implemented to include the amplifier 361 and the capacitor 363. In some implementations, the receiver 360 may be implemented to include a switch that provides a reset function instead of resistor 362. In some implementations, the receiver 360 may be implemented to output current by forming a unit gain feedback loop.

The output signal TDO may be used for the touch sensor controller 220 of FIG. 1 to generate touch data. For example, the touch sensor controller 220 may convert an output signal TDO (e.g., analog-digital conversion, current-voltage conversion, etc.), or amplify an output signal TDO. Since the noise signal is removed from the output signal TDO, the reliability of the touch data of the touch sensor controller 220 may be improved, and the touch sensing sensitivity may be improved. In some implementations, the touch sensor controller 220 may amplify a voltage output signal TDO, or filter out-of-band noise, and perform analog-to-digital conversion. In some implementations, when a receiver 360 outputs current, the touch sensor controller 220 may convert the current output signal into voltage and amplify it, or filter out-of-band noise and perform analog-to-digital conversion.

Figure 7:
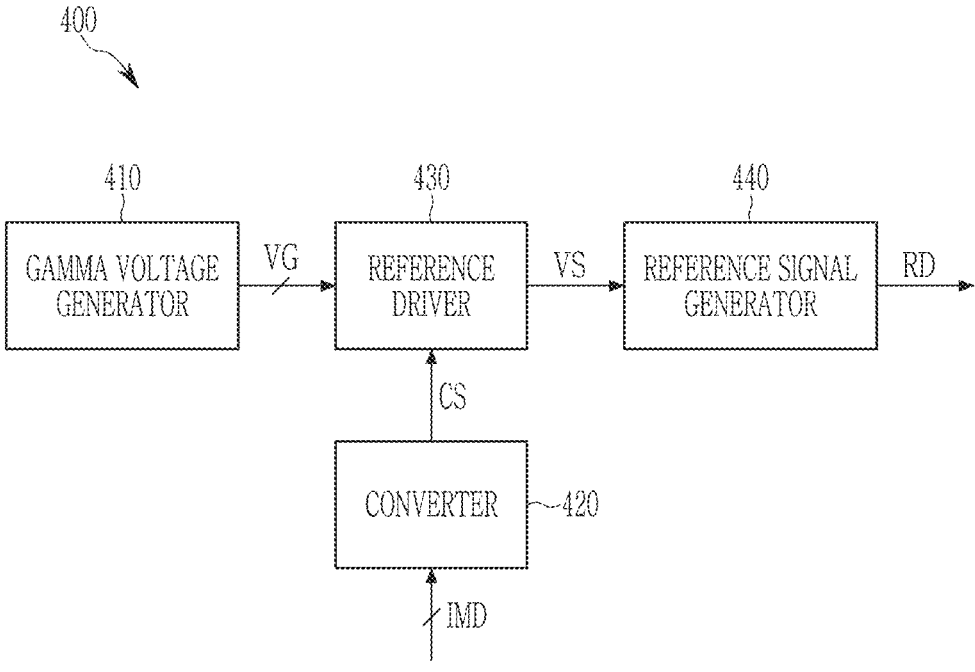
FIG. 7 is a block diagram of a touch screen driving circuit according to some implementations.

FIG. 7 is a block diagram of a touch screen driving circuit according to some implementations.

Referring to FIG. 7, a touch screen driving circuit 400 according to some implementations may include a gamma voltage generator 410, a converter 420, a reference driver 430, and a reference signal generator 440. In some implementations, a gamma voltage generator 410, a converter 420, and a reference driver 430 may form the display driving circuit 210 of FIG. 1, and the reference signal generator 440 may form the touch sensor controller 220 of FIG. 1. In some implementations, a gamma voltage generator 410 may form a display driving circuit 210, and a converter 420, a reference driver 430, and a reference signal generator 440 may form a touch sensor controller 220. Elements of the touch screen driving circuit 400 may be formed. combined, etc., in various ways depending on the implementation.

The gamma voltage generator 410 may generate a plurality of gamma voltages VG. For example, the gamma voltage generator 410 may receive a maximum gamma voltage and a minimum gamma voltage and may generate a plurality of gamma voltages (VG) based on the maximum gamma voltage and the minimum gamma voltage. The maximum gamma voltage and the minimum gamma voltage may be generated by an external power source or a DC-DC converter. The gamma voltage generator 410 may include at least one resistor string, and the gamma voltage generator 410 may generate the plurality of gamma voltages VG using at least one resistor string.

The converter 420 may receive a plurality of input image signals IMD. In some implementations, the plurality of input image signals IMD may be received from a host. In some implementations, multiple input image signals (IMD) may be generated by a display driving circuit (e.g., the display driving circuit 210 of FIG. 1) based on an input signal received from the host. The source driver of the display driving circuit may generate a plurality of source signals based on a plurality of input image signals IMD. The converter 420 may generate the conversion signal CS based on a plurality of input image signals IMD.

The converter 420 may perform a data processing operation to the plurality of input image signals IMD. For example, data processing operations may include a sum operation, a scaling operation, and an inversion operation. The converter 420 may generate a first processing signal by adding a plurality of input image signals IMD. The converter 420 may generate a second processing signal by scaling the first processing signal. For example, the converter 420 may scale down the first processing signal based on a ratio of number of the source driver and the reference driver 430. The ratio of numbers of the source drivers and the reference drivers 430 may indicate a ratio of number of amplifiers (or decoders) included in the source driver and number of amplifiers (or decoders) included in the reference driver 430. The converter 420 may generate a conversion signal CS by inverting the second processing signal. The converter 420 may output the conversion signal CS to the reference driver 430. In some implementations, the converter 420 may generate the conversion signal CS in an order different from the above-described method.

For example, the converter 420 may generate conversion signals CS in various ways, such as an order of inversion operation, sum operation, and scaling operation. In some implementations, the converter 420 may perform a data processing operation based on the horizontal synchronization signal. The converter 420 may receive a plurality of input image signals IMD at a level transition viewpoint (e.g., a viewpoint of transition from a low level to a high level) of the horizontal synchronization signal. The converter 420 may perform a data processing operation based on the plurality of input image signals IMD at the viewpoint of the level transition of the horizontal synchronization signal. The reference driver 430 and the reference signal generator 440 may perform operations based on the horizontal synchronization signal. For example, the converter 420, the reference driver 430, and the reference signal generator 440 may operate in synchronization with the horizontal synchronization signal.

The gamma voltage generator 410 may transfer the plurality of gamma voltages VG to the reference driver 430. A plurality of gamma lines may be disposed between the gamma voltage generator 410 and the reference driver 430. That is, the gamma voltage generator 410 and the reference driver 430 may be connected through a plurality of gamma lines, and the gamma voltage generator 410 may transfer the plurality of gamma voltages VG through a plurality of gamma lines.

The reference driver 430 may generate a selection signal VS based on the conversion signal CS and a plurality of gamma voltages VG. The reference driver 430 may output the selection signal VS to the reference signal generator 440.

The reference driver 430 may include a decoder and an amplifier. The decoder and the amplifier may be connected to each other. The decoder may receive the conversion signal CS, and the amplifier may output the selection signal VS. For example, the decoder may select one of a plurality of gamma voltages VG based on the selection signal VS. The decoder may output the selected gamma voltage to the amplifier. The amplifier may amplify the gamma voltage selected by the decoder and may generate the selection signal VS.

The reference signal generator 440 may generate a reference signal RD based on the selection signal VS. The reference signal generator 440 may tune the reference signal RD. The reference signal generator 440 may tune the reference signal RD so that the waveform of the reference signal RD becomes similar to the waveform (or voltage of the cathode layer) of the noise signal of the sensing signal (RS). For example, the reference signal generator 440 may control the damping factor and/or setting time of the reference signal RD. Accordingly, the reference signal RD may become substantially the same as the noise signal. The reference signal generator 440 may output the reference signal RD to the receiver. The receiver may remove a noise signal from the sensing signal based on the reference signal RD.

In some implementations, the converter 420 or the reference signal generator 440 may include a delay element. For example, the delay element of the converter 420 may delay the conversion signal CS. The delay element of the reference signal generator 440 may delay the selection signal VS. The phase of the reference signal RD may be changed through the delay element of the converter 420 or the reference signal generator 440. As such, since the reference signal generator 440 may generate a reference signal RD that is substantially the same as the waveform of the noise signal of the sensing signal (e.g., the sensing signal RS in FIG. 5), the receiver may effectively remove the noise signal, and the reliability of touch data and the touch sensing sensitivity may be improved.

Figure 8:
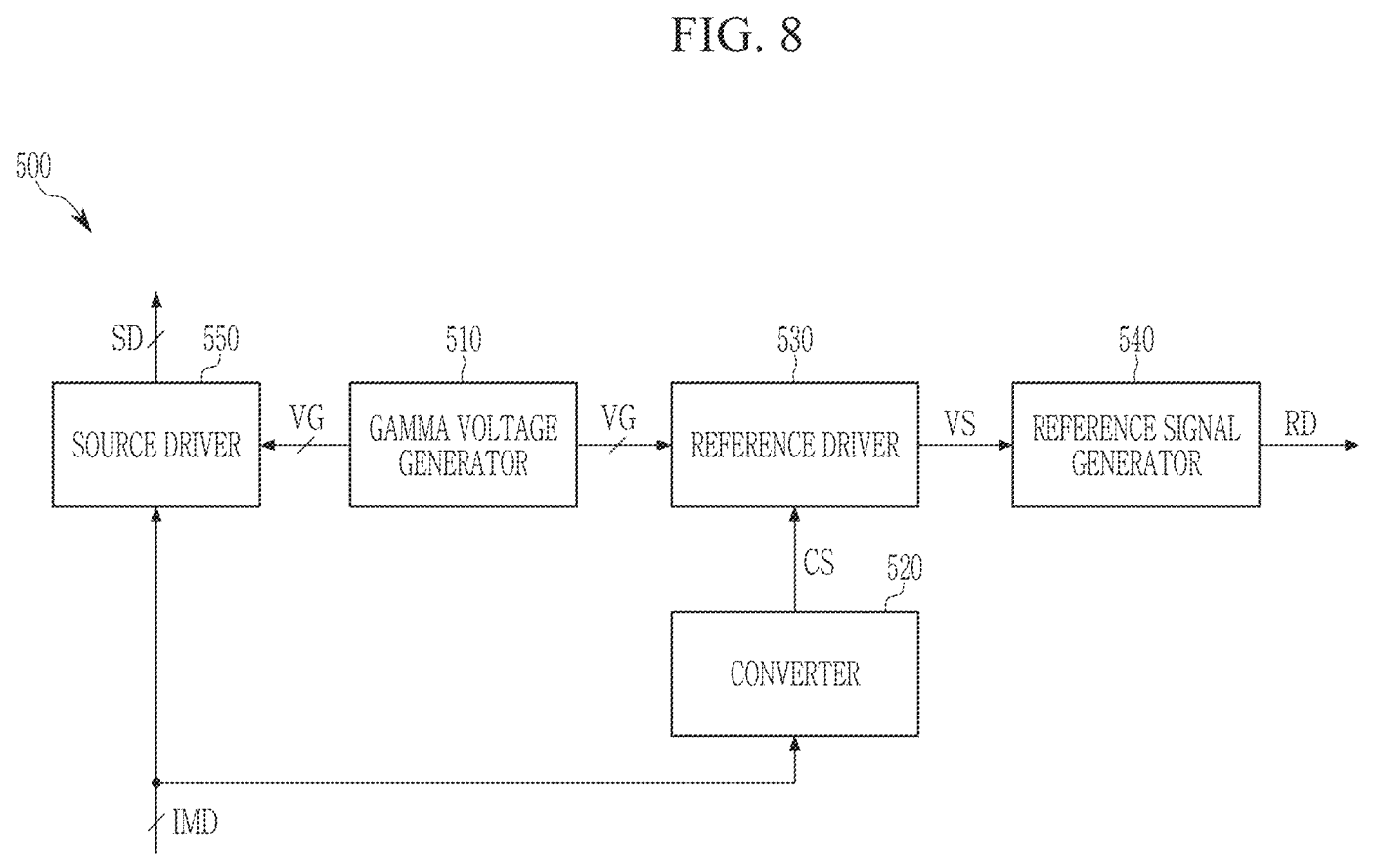
Figure 9:
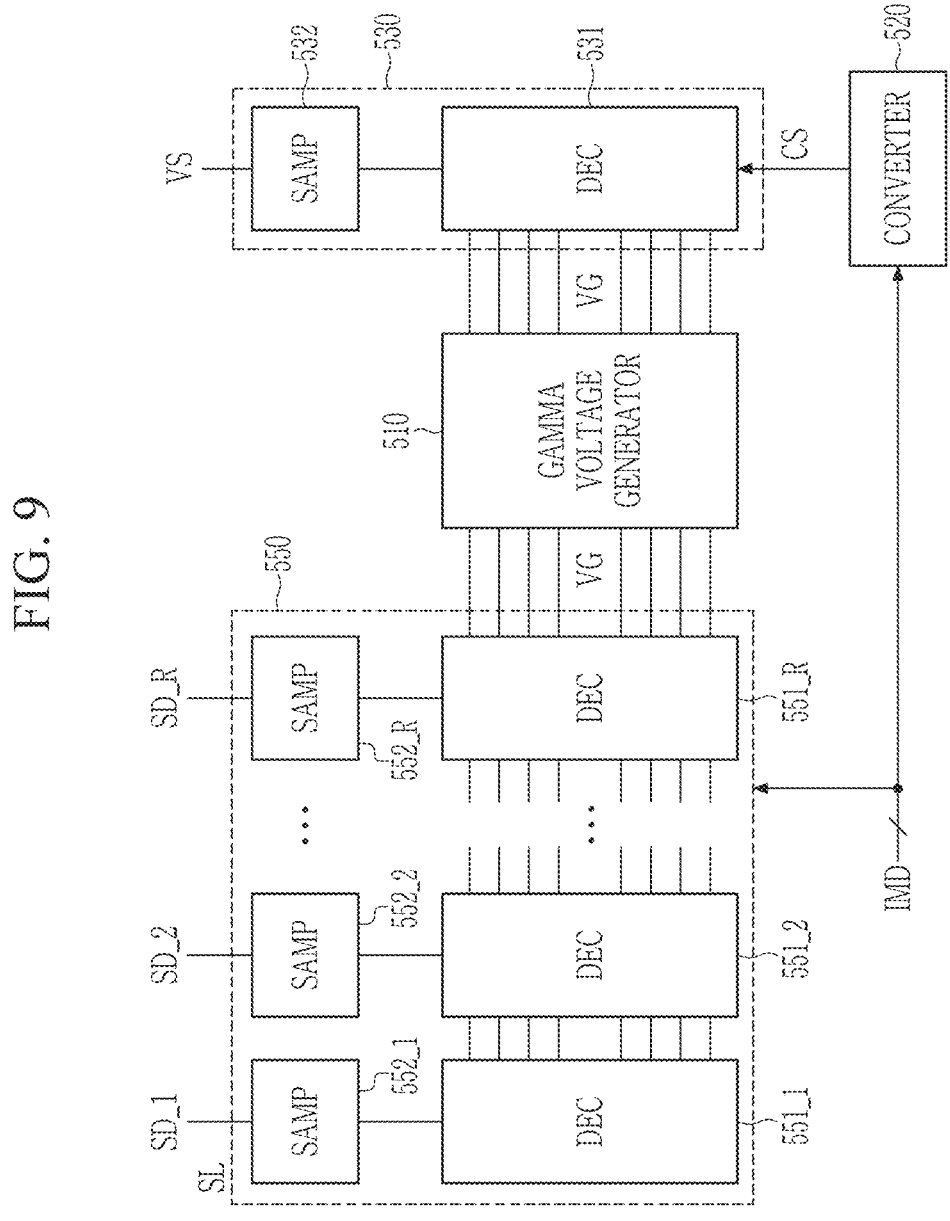
FIG. 9 is a block diagram illustrating a source driver and a reference driver in a touch screen driving circuit according to some implementations.
Figure 10:
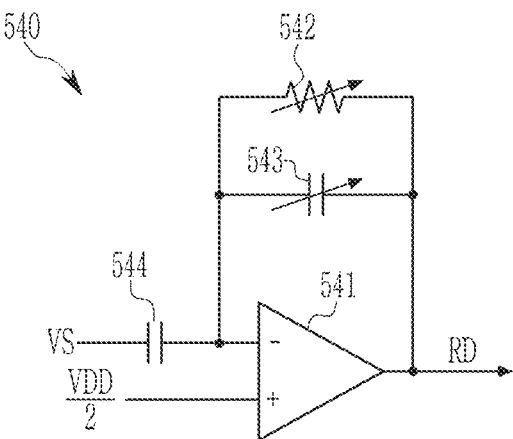
FIG. 10 is a circuit diagram of a reference signal generator according to some implementations.

FIG. 8 is a block diagram of a touch screen driving circuit according to some implementations, FIG. 9 is a block diagram illustrating a source driver and a reference driver in a touch screen driving circuit according to some implementations, and FIG. 10 is a circuit diagram of a reference signal generator according to some implementations.

Referring to FIG. 8, the touch screen driving circuit 500 according to some implementations may include a gamma voltage generator 510, a converter 520, a reference driver 530, a reference signal generator 540, and a source driver 550. In some implementations, the gamma voltage generator 510, converter 520, reference driver 530, and source driver 550 may form the display driving circuit 210 of FIG. 1, and the reference signal generator 540 may form the touch sensor controller 220 of FIG. 1. In some implementations, the gamma voltage generator 510 and the source driver 550 may form the display driving circuit 210, and the converter 520, reference driver 530, and the reference signal generator 540 may form the touch sensor controller 220. The elements of the touch screen driving circuit 500 may be formed in various ways. The characteristics described for the gamma voltage generator 410, the converter 420, the reference driver 430, and the reference signal generator 440 of FIG. 7 may be equally applied to the gamma voltage generator 510, the converter 520, the reference driver 530, and the reference signal generator 540 of FIG. 8. Accordingly, redundant descriptions will be omitted.

The gamma voltage generator 510 may generate a plurality of gamma voltages VG and transmit the plurality of gamma voltage (VG) to the reference driver 530 and the source driver 550. A plasma of gamma lines may be placed between the gamma voltage generator 510 and the reference driver 530, and between the gamma voltage generation 510 and the source driver 550. That is, the gamma voltage generator 510 is connected to the reference driver 530 and the source driver 550 through the plurality of gamma lines, and the gamma voltage generator 510 may transmit the plurality of gamma voltage VG through the plurality of gamma line. In some implementations, a plurality of gamma voltages VG transmitted by the gamma voltage generator 510 to the reference driver 530 may be different from a plurality of gamma voltages VG transmitted to the source driver 550.

The source driver 550 may receive a plurality of gamma voltages VG and a plurality of input image signals IMD. The source driver 550 may generate a plurality of source signals SD based on a plurality of gamma voltages VG and a plurality of input image signals IMD. The source driver 550 may generate a plurality of source signals SD in synchronization with the horizontal synchronization signal. Referring to FIG. 9, the source driver 550 may include a plurality of decoders 551_1 to 551_R (R is an integer greater than 1) and a plurality of source amplifiers 552_1 to 552_R. The plurality of decoders 551_1 to 551_R may correspond to the plurality of source amplifiers 552_1 to 552_R and may be connected to each other.

The plurality of decoders 551_1 to 551_R may receive a plurality of gamma voltages VG from the gamma voltage generator 510.

Each of the plurality of decoders 551_1 to 551_R may select one of the plurality of gamma voltages VG based on a plurality of input image signals IMD. In some implementations, the plurality of input image signals IMD are sampled, and the plurality of decoder 551_1 to 551_R may select one of the plurality of gamma voltages VG based on the sampled signal. Each of the plurality of decoders 551_1 to 551_R may output the selected gamma voltage to a corresponding one of the plurality of source amplifiers 552_1 to 552_R.

The plurality of source amplifiers 552_1 to 552_R may amplify a gamma voltage selected by the plurality of decoders 551_1 to 551_R and generate a plurality of source signals SD_1 to SD_R. The plurality of source amplifiers 552_1 to 552_R may transmit a plurality of source signals SD_1 to SD_R to the display panel through source lines SL. The display panel may display an image based on the plurality of source signals SD_1 to SD_R.

The reference driver 530 may include a decoder 531 and an amplifier 532. The decoder 531 and the amplifier 532 may be connected to each other.

The decoder 531 may receive an input of a plurality of gamma voltages VG from the gamma voltage generator 510. The decoder 531 may select one of the plurality of gamma voltages VG based on the conversion signal CS received from the converter 520. The converter 520 may generate the conversion signal CS based on the plurality of input image signals IMD. The decoder 531 may output the selected gamma voltage to the amplifier 532. The amplifier 532 may amplify the gamma voltage selected by the decoder 531 to generate the selection signal VS.

The numbers of the reference driver 530 and the source driver 550 may have a ratio of 1:R. The converter 520 may generate a first processing signal by adding the plurality of input image signals IMD. The converter 520 may generate a second processing signal by scaling the first processing signal. The converter 520 may scale the first processing signal based on the ratio (e.g., R:1) of the number of the source driver and the reference driver 430. For example, the converter 520 may generate the second processing signal by scaling the first processing signal by 1/R. For example, the second processing signal may have a size of 1/R that of the first processing signal. The converter 520 may generate a conversion signal CS by inverting the second processing signal.

The reference driver 530 may generate the selection signal VS based on the conversion signal CS and a plurality of gamma voltages VG. The reference driver 530 may output the selection signal VS to the reference signal generator 540.

The reference signal generator 540 may generate a reference signal RD based on the selection signal VS. The reference signal generator 540 may output the reference signal RD to the receiver. The receiver may remove a noise signal from the sensing signal based on the reference signal RD.

Referring to FIG. 10, a reference signal generator 540 according to some implementations may include an amplifier 541, a resistor 542, and capacitors 543 and 544. The capacitor 544 may receive the selection signal VS from the amplifier 532. One end of the capacitor 544 may be connected to the amplifier 532 and the other end thereof may be connected to the first input terminal of the amplifier 541. The capacitance of the capacitor 544 may be proportional to the parasitic capacitance CP1 to CPM of FIG. 5. For example, parasitic capacitance CP1 to CPM may be expressed by an equivalent capacitance such as CP [having units of farad, F], and the capacitance of the capacitor 544 may be 1/R times the equivalent capacitance (e.g., CP/R [F]). R may be a ratio of the number of the reference driver 530 and the source driver 550 described with reference to FIG. 9. The capacitor 544 may transfer the transfer signal to the first input terminal of the amplifier 541 based on the selection signal VS. The transfer signal may be determined by a transfer function based on the resistor 542 and the capacitors 543 and 544.

The resistor 542 and the capacitor 543 may form a negative feedback loop between the output terminal and the first input terminal of the amplifier 541. In some implementations, the reference signal generator 540 may include an amplifier 541 and a capacitor 543. In some implementations, the reference signal generator 540 may be implemented to include a switch, instead of the resistor 542, that provides a reset function.

The amplifier 541 may receive a transfer signal from the capacitor 544 at the first input terminal and a DC voltage (e.g., VDD/2) at the second input terminal. Here, the voltage VDD may be a driving voltage used to drive the touch screen driving circuit 500. The first input terminal may be an inverted input terminal (−), and the second input terminal may be a non-inverted input terminal (+). The amplifier 541 may generate the reference signal RD based on a difference between the transmission signal and the voltage VDD/2.

The reference signal generator 540 may be configured to tune the reference signal RD. The reference signal generator 540 may tune the reference signal RD so that the waveform of the reference signal RD is similar to the waveform of the noise signal (or voltage of the cathode layer) of the sensing signal RS. For example, the reference signal generator 540 may control the damping factor and/or the setting time of the reference signal RD. The resistance value of the resistor 542 and the capacitance of the capacitor 543 may be variable. The reference signal generator 540 may tune the reference signal RD by changing the resistance value of the resistor 542 and/or the capacitance of the capacitor 543. As such, since the reference signal generator 540 generates a reference signal RD similar to the waveform of the noise signal of the sensing signal RS, the receiver may effectively remove the noise signal, and the reliability of touch data and touch sensing sensitivity may be improved.

Figure 11:
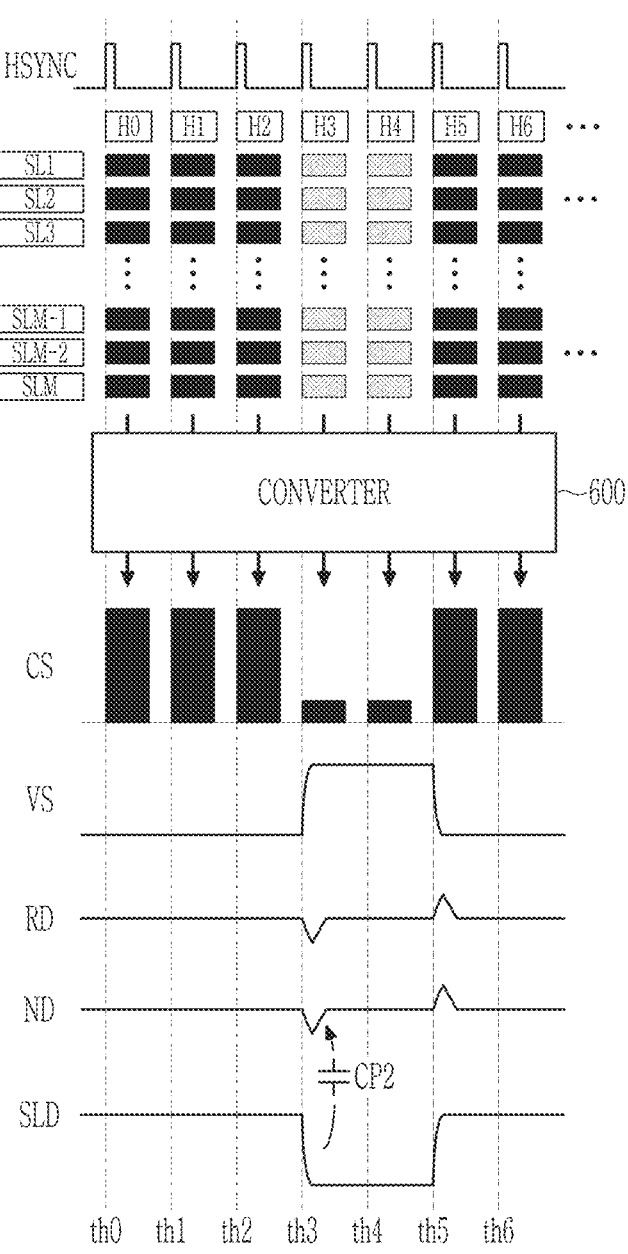
FIG. 11 is a diagram illustrating element signals of a touch screen device according to some implementations.

FIG. 11 illustrates examples of signals of each element of a touch screen device according to some implementations. Referring to FIG. 11, a touch screen device according to some implementations may display an image based on a horizontal synchronization signal HSYNC. The touch screen device may display an image based on the input image signals H0 to H6 at viewpoints th0 to th6. For example, the source driver of the touch screen device may generate a plurality of source signals based on the input image signals H0 to H6. The source driver may transfer the plurality of source signals to a plurality of source lines SL1 to SLM. The display panel may receive the plurality of source signals through the plurality of source lines SL1 to SLM and display the image based on the plurality of source signals.

In FIG. 11, illustrating crosstalk noise in harsh environments such as black-to-white and white-to-black, input image signals H0 to H2, H5, and H6 represent black signals and input image signals H3 and H4 represent white signals. For example, the touch screen device may exhibit a black-and-white conversion at the viewpoint th3 and may exhibit a white-and-black conversion at the viewpoint th4. However, implementations are not limited thereto, and the input image signal H0 to H6 may include information for displaying various images, and the touch screen device may remove crosstalk noise generated by changes in various input image signals H0 to H6.

In some implementations, the source driver may transfer the source signal SLD to a second source line SL2 among the plurality of source lines. In the display panel, a pixel corresponding to the second source line SL2 may display black from the viewpoint th0 to the viewpoint th3 based on the source signal SLD, white from the viewpoint th3 to the viewpoint th5, and display black from the viewpoint th5 to the viewpoint th6. The level transition of the source signal SLD may affect the voltage ND of the cathode layer adjacent to the second source line SL2. A parasitic capacitance CP2 may exist between the second source line SL2 and the cathode layer. The level transition of the source signal SLD may operate as crosstalk noise to the voltage ND of the cathode layer through parasitic capacitance CP2. The converter 600 may generate a conversion signal CS for removing the crosstalk noise.

The converter 600 may generate the conversion signal CS based on the input image signals H0 to H6. The converter 600 may perform a data processing operation on the input image signals H0 to H6 at the viewpoint th0 to th6. In some implementations, the converter 600 may perform a data processing operation based on the horizontal synchronization signal HSYNC. For example, when the first horizontal synchronization signal HSYNC is input at the viewpoint th0, the converter 600 may perform a data processing operation on the input image signal H0. Likewise, when the horizontal synchronization signal HSYNC inputs at the viewpoint th1 to th6, the converter 600 may perform a data processing operation on the input image signals H1 to H6.

The data processing operation may include an sum operation, a scaling operation, an inversion operation, and/or the like. The sum operation and the scaling operation may be understood as an averaging operation. In some implementations, the converter 600 may generate a first processing signal by adding the input image signals H0 to H6, scale the first processing signal to generate a second processing signal, and invert the second processing signal to generate a conversion signal CS. However, the implementations are not limited thereto, and the order or type(s) of data processing operations of the converter 600 may be implemented differently.

The converter 600 may perform a scaling operation based on the ratio of the number of source drivers and the reference drivers. For example, if the reference driver includes one amplifier and the source driver includes R amplifiers (R is an integer greater than 1), the converter 600 may perform a scaling operation using 1/R as a scaling coefficient.

The converter 600 may transmit the conversion signal CS to the reference driver. In addition, the reference driver may receive a plurality of gamma voltages from the gamma voltage generator. The plurality of gamma voltages may be linear gamma voltages. The reference driver may generate a selection signal VS based on the conversion signal CS and the plurality of gamma voltages. The reference driver may output the selection signal VS to the reference signal generator. The reference driver may include a decoder and an amplifier. The decoder and the amplifier may be connected to each other. The decoder may receive the conversion signal CS, and the amplifier may output the selection signal VS. For example, the decoder may select one of a plurality of gamma voltages based on the selection signal VS. The decoder may output the selected gamma voltage to the amplifier. The amplifier may amplify the gamma voltage selected by the decoder to generate the selection signal VS.

In some implementations, the plurality of gamma voltages may be non-linear gamma voltages. After performing a scaling operation, the converter 600 may further perform data processing operations such as a truncated operation and/or a rounding operation to compensate for data due to a nonlinear gamma voltage.

The reference signal generator may generate the reference signal RD based on the selection signal VS. The reference signal generator may tune the reference signal RD. The reference signal generator can tune the reference signal RD so that the waveform of the reference signal RD is similar to the waveform of the noise signal of the sensing signal RS (or the voltage of the cathode layer ND). For example, the reference signal generator may control the decay index and/or the settling time of the reference signal RD. The reference signal generator may output the reference signal RD to the receiver. The receiver may remove a noise signal from the sensing signal based on the reference signal RD.

As such, since the reference signal generator generates a reference signal RD similar to the waveform of the noise signal (or voltage of the cathode layer ND) of the sensing signal (e.g., the sensing signal RS in FIG. 5), the receiver may effectively remove the noise signal, and the reliability of the touch data and the touch sensing sensitivity may be improved.

Figure 12:
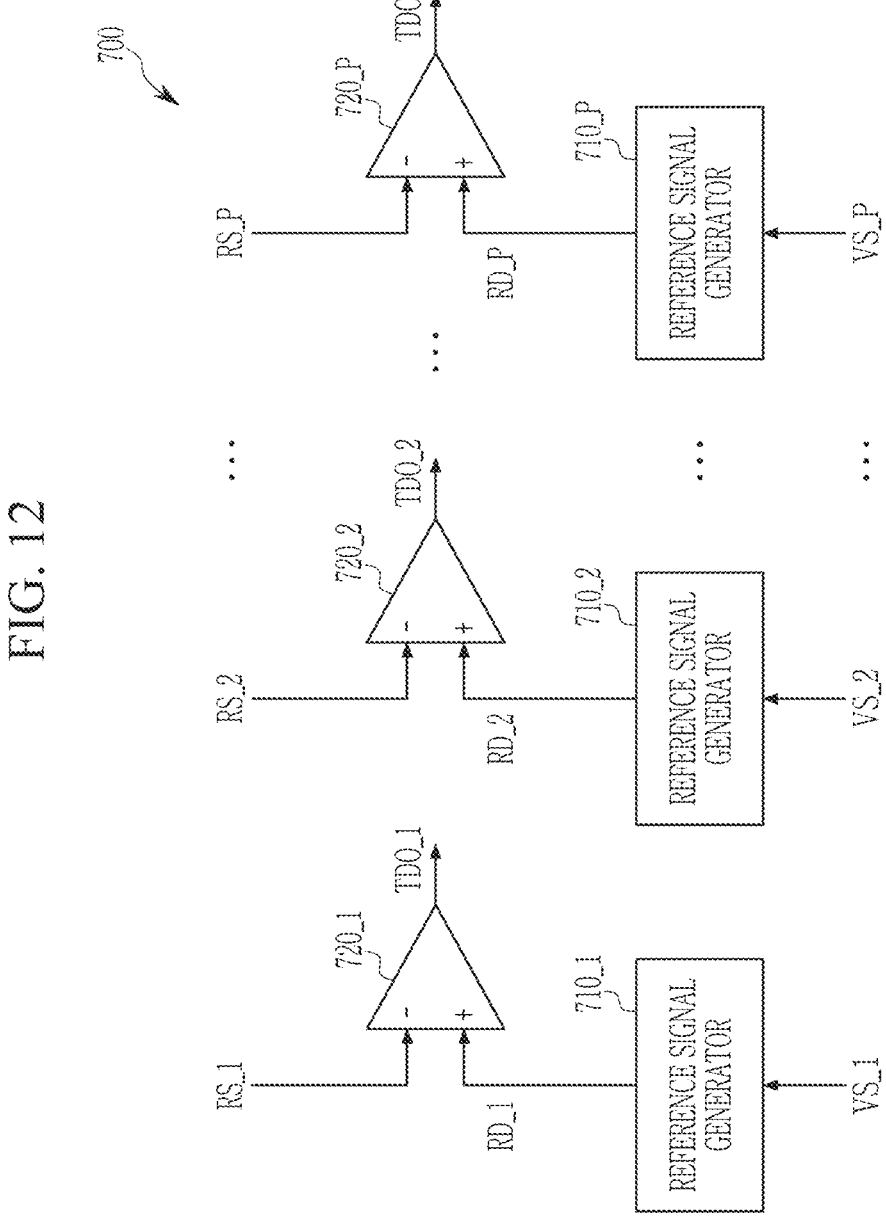
FIG. 12 is a block diagram illustrating the operation of a touch screen device according to some implementations.

FIG. 12 is a block diagram illustrating the operation of a touch screen device according to some implementations.

Referring to FIG. 12, the touch screen device 700 according to some implementations may include a plurality of reference signal generators 710_1 to 710_P (P is an integer greater than 1) and a plurality of receivers 720_1 to 720_P.

A plurality of reference signal generators 710_1 to 710_P may generate reference signals RD_1 to RD_P based on the selection signals VS_1 to VS_P. The selection signals VS_1 to VS_P may be generated from a corresponding reference driver. For example, the touch screen device 700 may include a plurality of reference drivers, and the plurality of reference drivers may generate selection signals VS_1 to VS_P. A touch region controlled by plurality of reference drivers may be different. For example, the touch region controlled by the plurality of receivers 720_1 to 720_P on the touch screen may be different, and also the touch region of the plurality of reference drivers corresponding to plurality of receivers 720_1 to 720_P may be different. For example, the selection signals VS_1 to VS_P may be different from each other. The touch area controlled by the plurality of receivers 720_1 to 720_P may correspond to a plurality of pixel areas in which the source driver transmits a plurality of source signals. The configuration of FIGS. 10 and 11 may be applied to the reference signal generators 710_1 to 710_P generating the reference signals RD_1 to RD_P.

The plurality of receivers 720_1 to 720_P may receive sensing signals RS_1 to RS_P from the receiving electrode. The plurality of receivers 720_1 to 720_P may remove the noise signal of the sensing signal RS_1 to RS_P based on the reference signals RD_1 to RD_P. The plurality of receivers 720_1 to 720_P may further include a resistor, a capacitor, etc. in the negative feedback loop. The plurality of receivers 720_1 to 720_P may generate output signals TDO_1 to TDO_P from which noise signals are removed from the sensing signals RS_1 to RS_P.

As such, as the touch screen device 700 according to some implementations removes noise signals from the sensing signals RS_1 to RS_P using different reference signals RD_1 to RD_P for each touch region, the reliability of touch data and the touch sensing sensitivity may be improved.

Although the number of a plurality of reference signal generators 710_1 to 710_P matches the number of a plurality of receivers 720_1 to 720_P in FIG. 12, implementations are not limited thereto, and the plurality of receivers 720_1 to 710_P and a plurality of reference signal generators 710_1 to 710_P may be implemented in a multi-to-one relationship. For example, at least two receivers of the plurality of receivers 720_1 to 720_P may correspond to one reference signal generator. For example, the first reference signal generator 710_1 may generate a first reference signal RD_1 and transfer the first reference signal RD_1 to the first and second receivers 720_1 and 720_2. The first and second reference signal generators 710_1 and 710_2 may remove noise signals from the sensing signals RS_1 and RS_2 based on the first reference signal RD_1. As such, the touch screen device 700 may reduce the number of reference signal generators.

Figure 13:
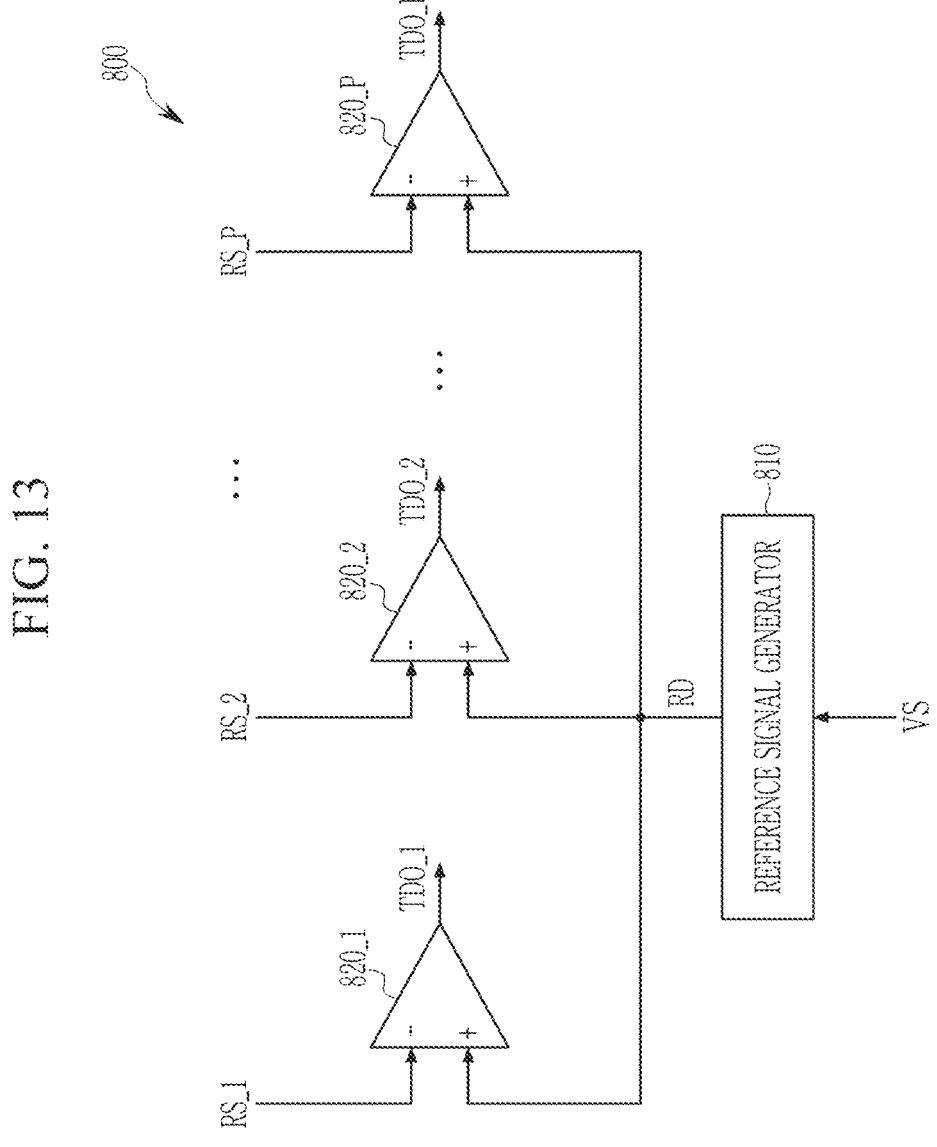
FIG. 13 is a block diagram illustrating the operation of a touch screen device according to some implementations.

FIG. 13 is a block diagram illustrating an operation of a touch screen device according to some implementations.

Referring to FIG. 13, the touch screen device 800 according to some implementations may include a reference signal generator 810 and a plurality of receivers 820_1 to 820_P, where P is an integer greater than 1.

The reference signal generator 810 may generate a reference signal RD based on the selection signal VS. The selection signal VS may be generated from the reference driver. The configuration of FIGS. 10 and 11 may be applied to the reference signal generator 810 generating the reference signal RD.

A plurality of receivers 820_1 to 820_P may receive sensing signals RS_1 to RS_P from the receiving electrode. The plurality of receivers 820_1 to 820_P may remove the noise signal of the sensing signals RS_1 to RS_P based on the reference signal RD. The plurality of receivers 820_1 to 820_P may further include a resistor, a capacitor, etc. in the negative feedback loop. The plurality of receivers 820_1 to 820_P may generate output signals TDO_1 to TDO_P from which the noise signals are removed from the sensing signals RS_1 to RS_P.

As such, as the touch screen device 800 according to some implementations may remove the noise signal from the sensing signal RS_1 through RS_P using the reference signal RD, the reliability and the touch sensing sensitivity of touch data may be improved.

Figure 14:
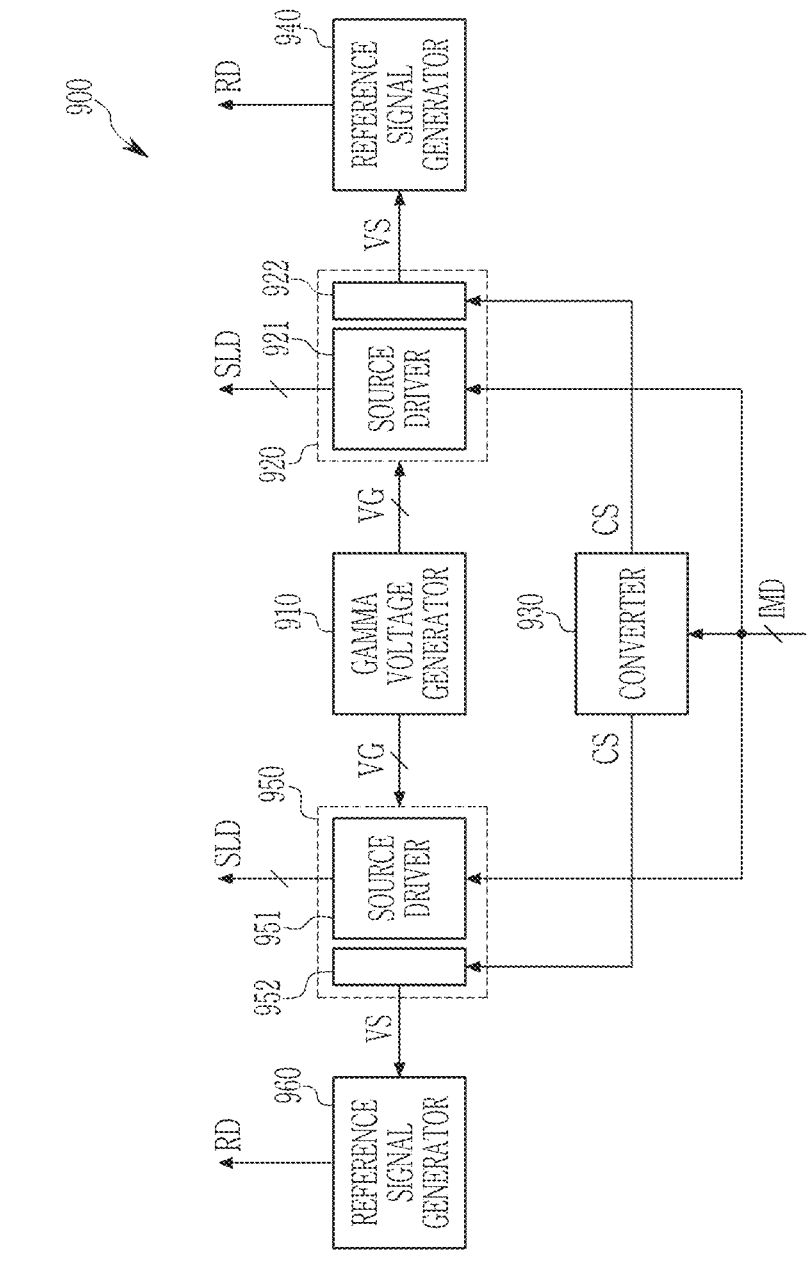
FIG. 14 is a block diagram of a touch screen driving circuit according to some implementations.

FIG. 14 is a block diagram of a touch screen driving circuit according to some implementations.

Referring to FIG. 14, a touch screen driving circuit 900 according to some implementations may include a gamma voltage generator 910, driver circuits 920, 950, a converter 930, and reference signal generators 940, 960. In some implementations, the gamma voltage generator 910, driver circuits 920, 950, and converter 930 may form the display driving circuit 210 of FIG. 1, and the reference signal generators 940 and 960 may form the touch sensor controller 220 of FIG. 1. In some implementations, the gamma voltage generator 910 and the source drivers 921 and 951 may form the display driving circuit 210, and the converter 930, the reference drivers 922, 952, and the reference signal generators 940, 960 may form the touch sensor controller 220. The elements of the touch screen driving circuit 900 may be formed, combined, etc., in various ways without departing from the scope of this disclosure.

The gamma voltage generator 910 may generate a plurality of gamma voltages VG and transmit the plurality of gamma voltages VG to the driver circuits 920, 950. A plurality of gamma lines may be arranged between the gamma voltage generator 910 and the driver circuits 920 and 950. That is, the gamma voltage generator 910 and the driver circuits 920, 950 are connected through a plurality of gamma lines, and the gamma voltage generator 910 may transfer a plurality of gamma voltages VG through a plurality of gamma lines. In some implementations, the plurality of gamma voltages VG that the gamma voltage generator 910 transfers to the driver circuit 920 and the plurality of gamma voltages VG that the gamma voltage generator 910 transfers to the driver circuit 950 may be different.

Electronic devices including touch screen driving circuit 900 may have limitations in electrical wire due to very thin bezels and standardized form factor compared to wide display panels. Due to these limitations, and/or for other reasons, the touch screen driving circuit 900 may include driver circuits 920 and 950 that are responsible for the different region in the touch screen. For example, the driver circuit 920 may operate in the upper region, and the driver circuit 950 may operate in the lower region. For example, the driver circuit 920 may operate in the left region, and the driver circuit 950 may operate in the right region. In some implementations, three or more driver circuits 920 and 950 may be implemented.

The driver circuits 920 and 950 may include source drivers 921 and 951, and reference drivers 922 and 952. The composition and operation of the driver circuits 920 and 950 may be substantially equivalent.

In addition, the composition and operation of the reference signal generators 940 and 960 may be substantially equivalent. Hereinafter, the composition and operation of the driver circuit 920 and the reference signal generator 940 are described, and a redundant description of the driver circuit 950 and the reference signal generator 960 is omitted.

The driver circuit 920 may include a source driver 921 and a reference driver 922. The source driver 921 may include a first decoder and a first source amplifier. The first decoder may correspond to and be connected to the first source amplifier. The first decoder may receive a plurality of gamma voltages VG from the gamma voltage generator 910.

The first decoder may select one of a plurality of gamma voltages VG based on the input image signal IMD. The input image signal IMD may be generated by a host or a display driving circuit. In some implementations, the input image signal IMD is sampled, and the first decoder may select one of a plurality of gamma voltages VG based on the sampled signal. The first decoder may output a selected gamma voltage to the first source amplifier. The first source amplifier may amplify the gamma voltage selected by the first decoder to generate the source signal SLD. The first source amplifier may transmit a source signal SLD to the display panel through a source line. The display panel may display an image based on the source signal SLD.

The reference driver 922 may include a second decoder and a second source amplifier. The second decoder and the second source amplifier may be connected to each other. The number of second source amplifiers (or second decoders) included in the reference driver 922 may be less than or equal to the number of first source amplifiers (or first decoders) included in the source driver 921. For example, the reference driver 922 and the source driver 921 may have a number ratio of 1:R. The number of second source amplifiers may be equal to the number of first source amplifiers multiplied by 1/Q (Q is a positive number greater than or equal to 1). In this case, 1/Q may be used by the converter 930 to generate the conversion signal CS.

The second decoder may receive a plurality of gamma voltages VG from the gamma voltage generator 910. The second decoder may select one of the pluralities of gamma voltages VG based on the conversion signal CS received from the converter 930. The converter 930 may generate the conversion signal CS based on a plurality of input image signals IMD. The second decoder may output the selected gamma voltage to the second source amplifier. The second source amplifier may amplify the gamma voltage selected by the second decoder to generate the selection signal VS.

The converter 930 may generate a first processing signal by adding a plurality of input image signals IMD. The converter 930 may generate a second processing signal by scaling the first processing signal. The converter 930 may scale a first processing signal based on the number ratio (i.e., Q:1) of the source driver 921 and the reference driver 922. For example, the converter 930 may generate a second processing signal by scaling the first processing signal by 1/Q. That is, the second processing signal may have a 1/Q size of the first processing signal. The converter 930 may generate a conversion signal CS by inverting the second processing signal. However, implementations are not limited thereto, and the converter 930 may generate a conversion signal CS in a different operation order and/or using different operations.

In addition, though the touch screen driving circuit 900 is shown to include one converter 930 in FIG. 14, in some implementations the touch screen driving circuit 900 may include first and second converters respectively corresponding to the driver circuits 920, 950. For example, the first converter may generate a first conversion signal for a region in which the reference driver 922 performs operations, and the second converter may generate a second conversion signal for a region in which the reference driver 952 performs operations.

The reference driver 922 may generate a selection signal VS based on the conversion signal CS and a plurality of gamma voltages VG. The reference driver 922 may output the selection signal VS to the reference signal generator 940.

The reference signal generator 940 may generate a reference signal RD based on the selection signal VS. The reference signal generator 940 may output the reference signal RD to the receiver. The receiver may remove a noise signal from the sensing signal based on the reference signal RD. The content of the reference signal generator 540 of FIG. 10 may be equally applied to the reference signal generator 940. Therefore, overlapping contents will be omitted.

As such, since the touch screen driving circuit 900 generates a reference signal RD similar to the waveform of the noise signal, the receiver may effectively remove the noise signal. Therefore, the reliability of touch data and touch sensing sensitivity may be improved.

Figure 15:
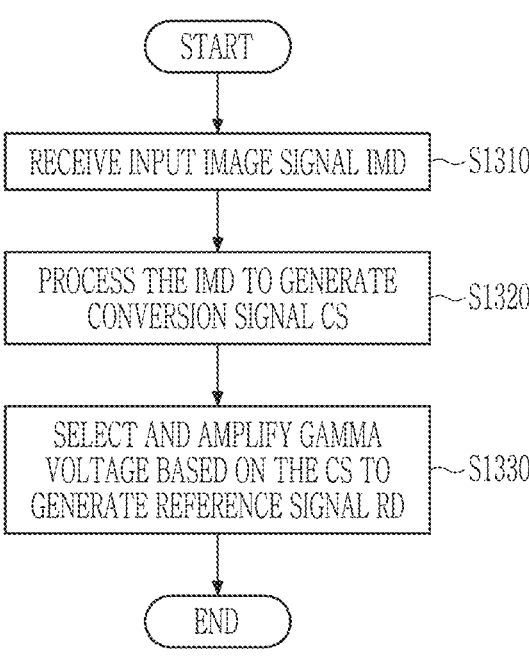
FIG. 15 and FIG. 16 are flowcharts of a method generating a reference signal according to some implementations.
Figure 16:
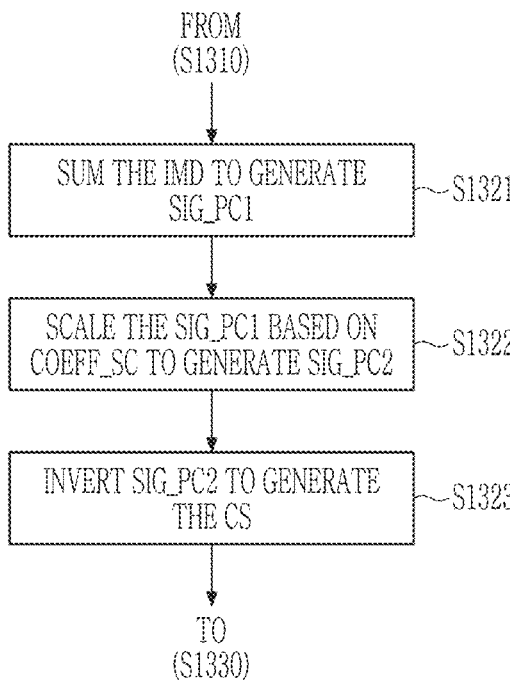

FIGS. 15 and 16 are flowcharts illustrating a method of generating a reference signal according to some implementations.

Referring to FIG. 15, a method of generating a reference signal according to some implementations may be performed by a touch screen driving circuit. The touch screen driving circuit may include a converter, a reference driver, and a reference signal generator.

The converter may receive the input image signal IMD (S1310).

The converter may receive the input image signal IMD from the host or the display driving circuit. In addition, the input image signal IMD may be input to the source driver of the display driving circuit. The source driver may generate a plurality of source signals based on the input image signal IMD. This source signal may be transmitted to the pixel through the source line, which may cause crosstalk noise in the cathode layer through parasitic capacitance. The crosstalk noise of the cathode layer may be transmitted to the receiver through the receiving electrode. The touch screen driving circuit may generate a reference signal to remove such noise.

The converter may generate a conversion signal CS by processing the input image signal IMD (S1320). The method of processing the input image signal (IMD) by the converter may include a sum operation, a scaling operation, and an inversion operation, and the order in which the converter executes each operation is not particularly limited.

For example, referring to FIG. 16, the converter may generate a first processing signal SIG_PC1 by adding the input image signal IMD (S1321). That is, the converter may add all the input image signals IMD.

In some implementations, the touch screen driving circuit may include a plurality of converters. For example, the touch screen driving circuit may include a first converter and a second converter. The first converter may add first to Uth input image signal among the input image signals IMD, and the second converter may add (U+1)th to Vth input image signal. In this case, U may be an integer greater than 1, and V may be an integer greater than U. The touch screen driving circuit may include a plurality of reference drivers and a plurality of reference signal generators corresponding to a plurality of converters. The number of pluralities of converters, the number of pluralities of reference drivers, and the number of pluralities of reference signal generators may be all the same.

The converter may generate the second processing signal SIG_PC2 by scaling the first processing signal SIG_PC1 based on the scaling coefficient COEFF_SC (S1322). The scaling coefficient COEFF_SC may be a ratio of a number of the source driver and the reference driver. As an example, when a source driver includes R amplifiers and a reference driver includes one amplifier, a scaling coefficient COEF- F_SC may be 1/R. As an example, when a source driver includes R amplifiers and a reference driver includes two amplifiers, a scaling coefficient COEFF_SC may be 2/R. The converter may determine the scaling factor COEFF_SC and multiply the first processing signal SIG_PC1 by the scaling factor COEFF_SC to generate the second processing signal SIG_PC2.

The converter may invert the second processing signal SIG_PC2 to generate the conversion signal CS (S1323). The converter may transfer the conversion signal CS to the reference signal generator.

Referring back to FIG. 14, the reference signal generator may select and amplify a gamma voltage based on the conversion signal CS to generate a reference signal RD (S1330). The reference signal generator may transfer the reference signal RD to the receiver. The receiver may receive a sensing signal from the receiving electrode and may receive a reference signal RD from the reference signal generator. The receiver may remove a noise signal from the sensing signal based on the reference signal RD. The output signal of the receiver may be converted and used to generate touch data. The touch screen driving circuit may determine touch coordinates based on touch data.

Figure 17:
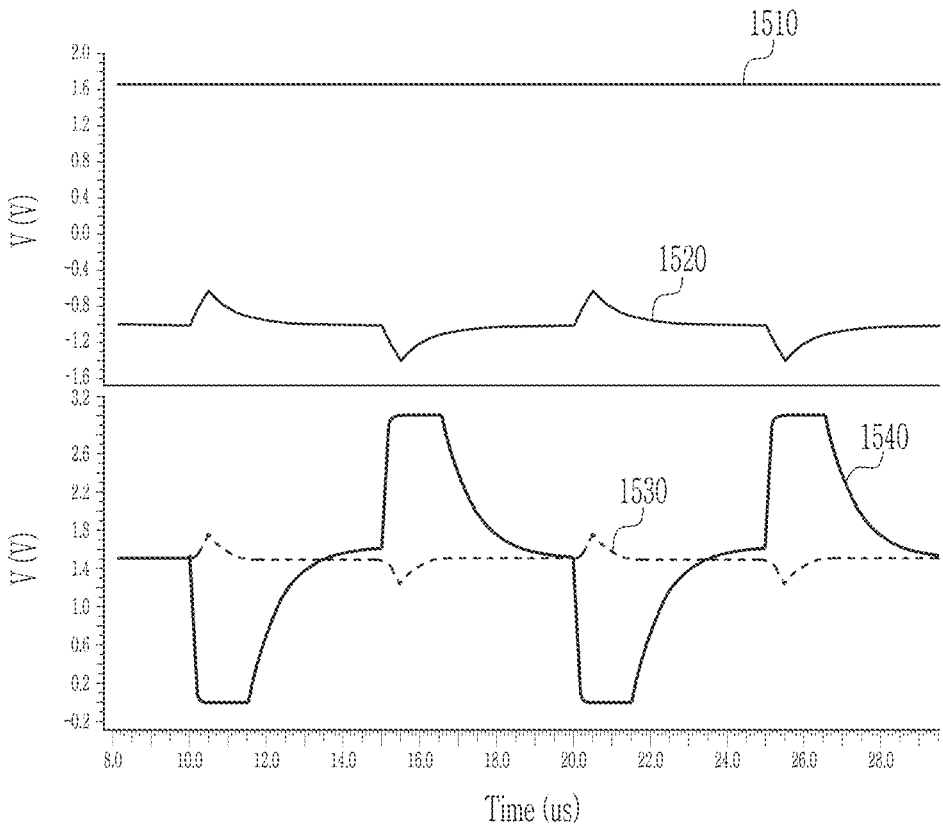
FIGS. 17 and 18 are graphs illustrating a noise removing operation of a receiver according to some implementations.
Figure 18:
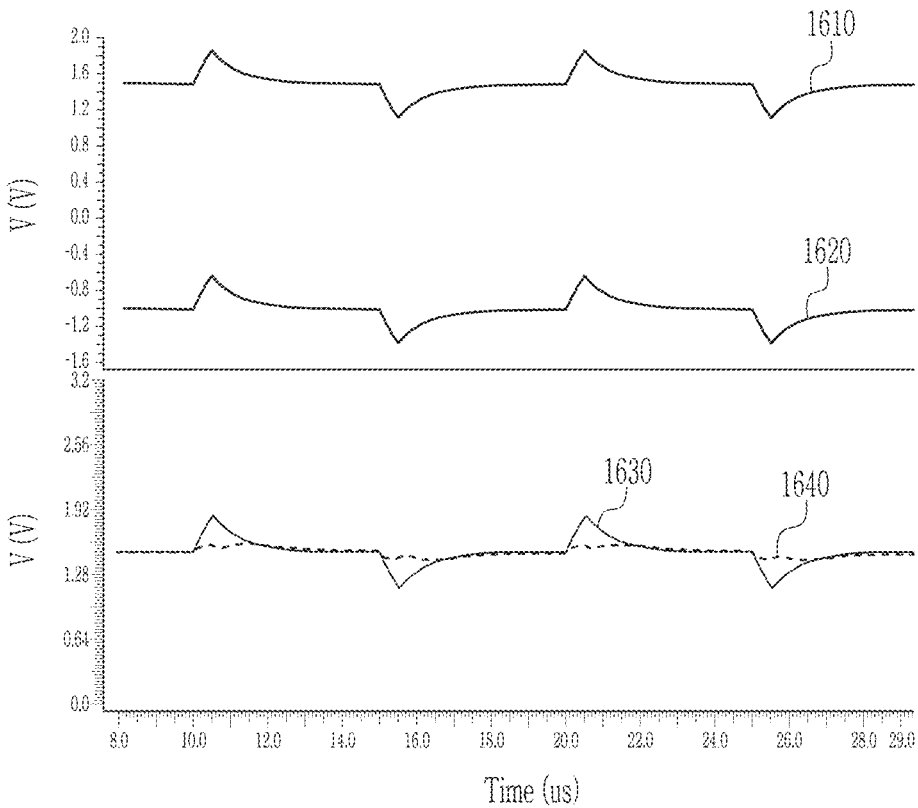

FIGS. 17 and 18 are graphs illustrating the noise removing operation of the receiver according to some implementations. FIG. 17 is an example of signals of each element of the touch screen device when the conventional touch screen device does not include a reference signal generator, and FIG. 18 is an example of the signals of each element of the touch screen device when a touch screen device according to some implementations includes a reference signal generator. In FIGS. 17 and 18, the X-axis of the graph may represent time and the Y-axis may represent voltage values. That is, FIGS. 17 and 18 may show a change in voltage values of each signal over time.

Referring to FIG. 17, a graph 1510 may represent a DC voltage applied to one input terminal of a receiver, a graph 1520 may represent a voltage of a cathode layer, a graph 1530 may represent a sensing signal, and a graph 1540 may represent a touch signal.

The receiver according to some implementations may receive a DC voltage and a sensing signal such as the graphs 1510 and 1530. For example, the receiver may receive a sensing signal from a receiving electrode and receive a DC voltage from a power source. Referring to graph 1530, the sensing signal may include a noise signal according to a voltage change of the cathode layer. A level transition of the source signal in the light emitting layer may affect the voltage of the cathode layer by parasitic capacitance between the light emitting layer and the cathode layer. Referring to graph 1520, it is understood that the voltage of the cathode layer may include a noise signal. Since the receiver does not receive the same reference signal as shown in FIG. 18, the sensing signal still may include the noise signal. Referring to graph 1540, a touch signal output by a receiver may include a noise component. In other words, since the touch signal output from the conventional receiver includes a noise component, it is difficult to distinguish whether the change in the touch signal is due to the touch input or the noise component, so the reliability and touch sensing sensitivity of the touch data may be low.

Referring to FIG. 18, graph 1610 may represent a reference signal, a graph 1620 may represent a voltage of a cathode layer, a graph 1630 may represent a sensing signal, and a graph 1640 may represent a touch signal.

The receiver according to some implementations may receive a reference signal and a sensing signal such as the graph 1610 and 1630. For example, the receiver may receive a sensing signal from a receiving electrode and receive a reference signal from a reference signal generator. Referring to graph 1630, the sensing signal may include a noise signal according to a voltage variation of the cathode layer. A level transition of the source signal of the light emitting layer may affect the voltage of the cathode layer by parasitic capacitance between the light emitting layer and the cathode layer. Referring to graph 1620, it is understood that the voltage of the cathode layer includes a noise signal. The receiver may remove a noise signal from the sensing signal based on the reference signal. Referring to graph 1610, a reference signal generator may generate a reference signal similar to a noise signal. Referring to graph 1640, a receiver may generate a touch signal obtained by removing a noise signal from a sensing signal. That is, since the receiver may remove the noise signal caused by the source signal from the sensing signal, the reliability of the touch data and the touch sensing sensitivity may be improved.

Figure 19:
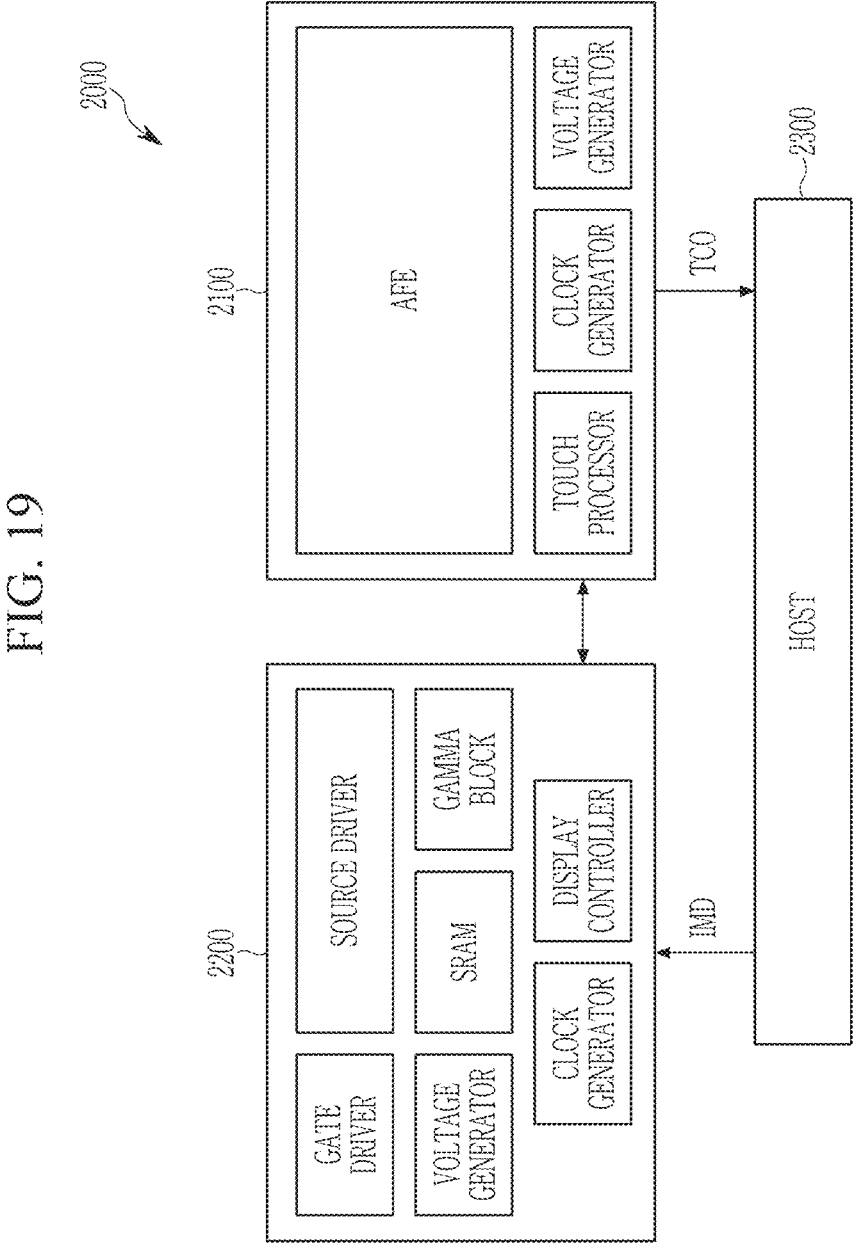
FIG. 19 is a block diagram of an electronic device according to some implementations.

FIG. 19 is a block diagram of an electronic device according to some implementations.

Referring to FIG. 19, an electronic device 2000 according to some implementations may include a touch sensor controller 2100, a display driving circuit DDI 2200, and a host 2300. According to some implementations, the touch sensor controller 2100 and the DDI 2200 may be integrated in a single semiconductor chip or implemented separately in a plurality of semiconductor chips.

The touch sensor controller 2100 and the DDI 2200 may operate under the control of the host 2300, and the DDI 2200 may drive the display panel 120 to receive an input image signal IMD from the host 2300 and to display an image according to the input image signal IMD on the display panel 120 of FIG. 1.

The touch sensor controller 2100 may scan the touch sensor (110 in FIG. 1) and determine touch coordinates (TCO) based on sensing signals received from the touch sensor 110. The touch sensor controller 2100 may provide touch coordinates (TCO) to the host 2300.

The touch sensor controller 2100 may include an analog-front end (AFE), a touch processor, a clock generator, and a voltage generator. In addition, the touch sensor controller 2100 may include interface circuits for communication with the DDI 2200 and the host 2300.

As a non-limiting example, the interface circuit for communication with the DDI 2200 may be implemented by one of interface methods such as a Universal Asynchronous Receiver Transmitter (UART) interface, an Inter-Integrated Circuit (I2C) interface, an Improved Inter-integrated Circuit (I3C) interface, a Serial Peripheral Interface (SPI), a Mobile Industry Processor Interface (MIPI), and an embedded Display Port (eDP).

An interface circuit for communication with the host 2300 may be implemented by one of various interface methods such as universal serial bus (USB) interface, universal flash storage (UFS) interface, multimedia controller (MMC) interface, embedded MMC (eMMC) interface, peripheral component interconnect express (PCIe) interface, advanced technology attachment (ATA) interface, serial advanced technology attachment (PATA) interface, parallel advanced technology attachment (PATA)t). It can be implemented as one of various interfaces such as an interface, SCSI (Small Computer System Interface), SAS (Serial Attached SCSI), ESDI (Enhanced Small Disk Interface), IDE (Integrated Drive Electronics) interface, and high-speed serial interface.

The clock generator may generate a clock signal used inside the touch sensor controller 2100, and the voltage generator may generate voltages used in AFE.

The AFE includes a receiver 360 described with reference to FIG. 5, and the description of FIG. 5 may be equally applied here. For example, the AFE may receive a sensing signal from the receiving electrode and receive a reference signal from the reference signal generator. The AFE may remove a noise signal from the sensing signal based on the reference signal and generate a touch signal. The AFE may transfer a touch signal to the touch processor.

The touch processor may control the overall operation of the touch sensor controller and may include the reference signal generator 440 of FIG. 7. For example, the touch processor may generate a reference signal based on the selection signal. In some implementations, the touch processor may further include the converter 420 and the reference driver 430 of FIG. 7. The touch processor may generate a conversion signal from the input image signal using a converter. The touch processor may generate a selection signal based on the conversion signal using a reference driver. The operation of a converter, a reference driver, and a reference signal generator has been described with reference to FIG. 7, and descriptions thereof will not be repeated. The touch processor may receive a touch signal from the AFE and generate touch data based on the touch signal. The touch processor may determine the touch coordinates (TCO) based on the touch data.

The DDI 2200 may include a clock generator, a display controller, a voltage generator, a gamma block, a static random-access memory (SRAM), a gate driver, and a source driver. In addition, the DDI 2200 may include interface circuits for communication with the touch sensor controller 2100 and the host 2300.

The clock generator may generate clock signals used inside the DDI 2200, such as clock signals provided to the source driver and the gate driver. The voltage generator may generate voltages used in the gate driver and the source driver and the gamma block may generate a plurality of grayscale voltages corresponding to the plurality of grayscale that the pixel value may have and may provide to the source driver. The SRAM may store the input image signal IMD received from the host 2300, and, for example, the SRAM may store the input image signal IMD through a plurality of lines or may store the input image signal IMD in units of one frame and provide the input image signal IMD to the source driver through a plurality of lines.

The gate driver may sequentially provide gate signals (scan signals) to the plurality of gate lines (scan lines) provided on the display panel (120 in FIG. 1), and the source driver may simultaneously provide source signals to the pluralities of source lines (data lines) provided on the display panel (120 in FIG. 1).

The display controller may control the overall operation of the DDI 2200. The display controller may control a gate driver, a source driver, a gamma block, and the like.

The touch sensor controller 2100 and the DDI 2200 may communicate with each other inside the electronic device 2000, and the touch sensor controller 2100 and the DDI 2200 may have ports for communication with each other, such as a first port and a second port, respectively. A clock signal, voltage, data, and the like may be transmitted and received through data lines connected through the first port and the second port.

In some implementations, respective element or a configuration of two or more element described with reference to FIGS. 1 to 19 may be implemented as a digital circuit, a programmable or unprogrammable logic device or array, an application-specific integrated circuit (ASIC), or the like.

While this disclosure contains many specific implementation details, these should not be construed as limitations on the scope of what may be claimed. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a combination can in some cases be excised from the combination, and the combination may be directed to a subcombination or variation of a subcombination.

Although various examples in accordance with the present disclosure have been described in detail, the scope of the present disclosure is not limited thereto, and various modifications also belong in the scope of the present disclosure.

What is claimed is:

1. A touch sensor controller comprising:
   a reference signal generator configured to generate a reference signal based on an input image signal; and
   a receiver connected to a touch electrode, the receiver configured to receive a sensing signal from the touch electrode and generate an output signal based on a difference between the reference signal and the sensing signal.

2. The touch sensor controller of claim 1, wherein the reference signal generator is configured to:
   receive a selection signal generated based on the input image signal;
   generate the reference signal based on the selection signal; and
   control at least one of a damping factor or a settling time of the reference signal using a variable capacitor and a variable resistor.

3. The touch sensor controller of claim 2, wherein the reference signal generator comprises:
   a first amplifier having a first input terminal, a second input terminal, and an output terminal, wherein the first amplifier is configured to
      receive the selection signal from the first input terminal,
      receive a direct current (DC) voltage from the second input terminal, and
      generate the reference signal based on the selection signal and the DC voltage;
   a first capacitor having a first terminal to which the selection signal is applied and a second terminal to which the first input terminal of the first amplifier is connected;
   a second capacitor having a third terminal to which the first input terminal is connected and a fourth terminal to which the output terminal of the first amplifier is connected; and
   a resistor connected in parallel with the second capacitor.

4. The touch sensor controller of claim 3, comprising:
   a reference driver configured to receive a conversion signal generated based on the input image signal and generate the selection signal based on the conversion signal; and
   a converter configured to perform a data processing operation on the input image signal to generate the conversion signal.

5. The touch sensor controller of claim 4, wherein the reference driver comprises:
   a decoder configured to receive a plurality of gamma voltages and select one gamma voltage among the plurality of gamma voltages based on the conversion signal; and
   a second amplifier configured to amplify the selected one gamma voltage to generate the selection signal.

6. The touch sensor controller of claim 4, wherein the converter is configured to perform a sum operation, a scaling operation, and an inversion operation on the input image signal to generate the conversion signal.

7. The touch sensor controller of claim 6, wherein the converter is configured to perform the scaling operation using a scaling coefficient that is a ratio of (i) a number of reference drivers to (ii) a number of source drivers generating a plurality of source signals based on the input image signal.

8. The touch sensor controller of claim 7, wherein a capacitance of the first capacitor is an equivalent parasitic capacitance divided by the ratio, and wherein the equivalent parasitic capacitance is a capacitance between (i) a plurality of source lines to which the plurality of source signals are applied and (ii) a cathode layer of a touch screen device controlled by the touch sensor controller.

9. The touch sensor controller of claim 3, wherein the first amplifier is configured to receive half of a driving voltage from the second input terminal.

10. A touch screen driving circuit comprising:
   a display driving circuit configured to generate a plurality of source signals based on an input image signal and provide the plurality of source signals to a plurality of source lines; and
   a touch sensor controller configured to
      receive a plurality of sensing signals from a plurality of touch electrodes,
      generate, based on the input image signal, a reference signal having the same waveform as a waveform of a noise signal transmitted to the plurality of touch electrodes by the plurality of source signals, and
      generate a plurality of touch signals based on the plurality of sensing signals and the reference signal.

11. The touch screen driving circuit of claim 10, wherein the touch sensor controller comprises:
   a plurality of receivers configured to receive the plurality of sensing signals from a plurality of receiving electrodes and configured to, based on the reference signal, remove respective noise signals from the plurality of sensing signals to thereby generate the plurality of touch signals.

12. The touch screen driving circuit of claim 11, further comprising:
   a converter configured to perform a data processing operation on the input image signal to generate a conversion signal; and
   a reference driver configured to receive a plurality of gamma voltages and the conversion signal and generate a selection signal based on the plurality of gamma voltages and the conversion signal,
   wherein the touch sensor controller is configured to generate the reference signal based on the selection signal.

13. The touch screen driving circuit of claim 10, wherein the touch sensor controller comprises:
   a first reference signal generator configured to generate a first reference signal based on a first selection signal generated based on the input image signal;

a second reference signal generator configured to generate a second reference signal based on a second selection signal generated based on the input image signal; and a plurality of receivers configured to receive the plurality of sensing signals from a plurality of receiving electrodes, and remove respective noise signals from the plurality of sensing signals based on the first reference signal or the second reference signal, to generate the plurality of touch signals.

14. The touch screen driving circuit of claim 13, comprising:

a first converter configured to perform a first data processing operation on a first input image signal to generate a first conversion signal;

a first reference driver configured to receive a plurality of gamma voltages and the first conversion signal, and generate the first selection signal based on the plurality of gamma voltages and the first conversion signal;

a second converter configured to perform a second data processing operation on a second input image signal to generate a second conversion signal; and a second reference driver configured to receive the plurality of gamma voltages and the second conversion signal, and generate the second selection signal based on the plurality of gamma voltages and the second conversion signal.

15. The touch screen driving circuit of claim 10, wherein the display driving circuit is configured to generate the plurality of source signals in synchronization with a horizontal synchronization signal, and wherein the touch sensor controller is configured to generate the reference signal in synchronization with the horizontal synchronization signal, and generate the plurality of touch signals based on the plurality of sensing signals and the reference signal within a period of the horizontal synchronization signal.

16. The touch screen driving circuit of claim 10, wherein the plurality of touch electrodes are configured to output the plurality of sensing signals based on a mutual capacitance between the plurality of touch electrodes and a plurality of driving electrodes to which one or more driving signals are applied.

17. A method of driving a touch screen, comprising:

receiving an input image signal;

generating a conversion signal by processing the input image signal;

selecting a gamma voltage based on the conversion signal;

generating a reference signal by amplifying the selected gamma voltage; and removing a noise signal from a sensing signal based on the reference signal.

18. The method of claim 17, wherein generating the conversion signal comprises:

generating a first processing signal by adding together the input image signal;

generating a second processing signal by scaling the first processing signal; and generating the conversion signal by inverting the second processing signal.

19. The method of claim 18, wherein generating the second processing signal comprises:

determining a scaling coefficient based on a ratio between a number of source drivers and a number of reference drivers; and generating the second processing signal by scaling the first processing signal based on the scaling coefficient.

20. The method of claim 17, wherein generating the reference signal comprises:

controlling at least one of a damping factor or a settling time of the reference signal such that the reference signal is equal to the noise signal.

* * * * *